US006892293B2

(12) United States Patent
Sachs et al.

(10) Patent No.: US 6,892,293 B2
(45) Date of Patent: *May 10, 2005

(54) VLIW PROCESSOR AND METHOD THEREFOR

(75) Inventors: Howard G. Sachs, Los Altos, CA (US); Siamak Arya, Cupertino, CA (US)

(73) Assignee: Intergraph Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/057,861

(22) Filed: Apr. 9, 1998

(65) Prior Publication Data

US 2003/0191923 A1 Oct. 9, 2003

Related U.S. Application Data

(63) Continuation of application No. 08/754,337, filed on Nov. 22, 1996, now Pat. No. 5,794,003, which is a continuation of application No. 08/498,135, filed on Jul. 5, 1995, now abandoned, which is a continuation of application No. 08/147,797, filed on Nov. 5, 1993, now abandoned.

(51) Int. Cl.[7] ................................................ G06F 9/38
(52) U.S. Cl. ..................... 712/215; 712/24; 712/206
(58) Field of Search ......................... 712/23, 24, 206, 712/208, 213, 214, 215, 216, 233, 234

(56) References Cited

U.S. PATENT DOCUMENTS

| 4,295,193 A | 10/1981 | Pomerene |
| 4,437,149 A | 3/1984 | Pomerene et al. |
| 4,833,599 A | 5/1989 | Colwell et al. |
| 4,847,755 A | 7/1989 | Morrison et al. |
| 4,888,679 A | 12/1989 | Fossum et al. |
| 4,920,477 A | 4/1990 | Colwell et al. |
| 4,933,837 A | 6/1990 | Freidin |
| 5,021,945 A | 6/1991 | Morrison et al. |
| 5,051,885 A | 9/1991 | Yates et al. |

(Continued)

FOREIGN PATENT DOCUMENTS

| EP | 0021399 A1 | 1/1981 |
| EP | 0363222 | 4/1990 |
| EP | 0449661 A2 | 1/1991 |
| EP | 0 451 562 A2 | 3/1991 |
| EP | 0426393 | 5/1991 |
| EP | 0463229 A2 | 1/1992 |
| EP | 0463296 A2 | 1/1992 |
| EP | 0 496 407 A2 | 1/1992 |
| EP | 0 496 928 | 8/1992 |
| EP | 0652510 | 5/1995 |
| WO | WO 86/03038 | 5/1986 |
| WO | WO 88/08568 | 11/1988 |
| WO | 98/38791 | 9/1998 |

OTHER PUBLICATIONS

Gray et al., "Static Instruction Scheduling for the HARP Multiple–Instruction–Issue Architecture", *Technical Report 142,* University of Hertfordshire, Hatfield, Herts UK, Oct. 1992.

(Continued)

*Primary Examiner*—Viet D. Vu
(74) *Attorney, Agent, or Firm*—Townsend and Townsend and Crew LLP

(57) ABSTRACT

A computing system as described in which individual instructions are executable in parallel by processing pipelines, and instructions to be executed in parallel by different pipelines are supplied to the pipelines simultaneously. The system includes storage for storing an arbitrary number of the instructions to be executed. The instructions to be executed are tagged with pipeline identification tags indicative of the pipeline to which they should be dispatched. The pipeline identification tags are supplied to a system which controls a crossbar switch, enabling the tags to be used to control the switch and supply the appropriate instructions simultaneously to the differing pipelines.

90 Claims, 12 Drawing Sheets

U.S. PATENT DOCUMENTS

| | | | |
|---|---|---|---|
| 5,051,940 | A | 9/1991 | Vassiliadis et al. |
| 5,055,997 | A | 10/1991 | Sluijter et al. |
| 5,057,837 | A | 10/1991 | Colwell et al. |
| 5,081,575 | A | 1/1992 | Hiller et al. |
| 5,101,341 | A | 3/1992 | Circello et al. |
| 5,121,502 | A | 6/1992 | Rau et al. |
| 5,129,067 | A | 7/1992 | Johnson |
| 5,151,981 | A | 9/1992 | Westcott et al. |
| 5,179,680 | A | 1/1993 | Colwell et al. |
| 5,197,135 | A | 3/1993 | Eickemeyer et al. |
| 5,197,137 | A | 3/1993 | Kumar et al. |
| 5,203,002 | A | 4/1993 | Wetzel |
| 5,214,763 | A | 5/1993 | Blaner et al. |
| 5,226,169 | A | 7/1993 | Gregor |
| 5,233,696 | A | 8/1993 | Suzuki |
| 5,239,654 | A | 8/1993 | Ing-Simmons et al. |
| 5,276,819 | A | 1/1994 | Rau et al. |
| 5,276,821 | A | 1/1994 | Imai et al. |
| 5,287,467 | A | 2/1994 | Blaner et al. |
| 5,295,249 | A | 3/1994 | Blaner et al. |
| 5,297,255 | A | 3/1994 | Hamanaka et al. |
| 5,297,281 | A | 3/1994 | Emma et al. |
| 5,299,321 | A | 3/1994 | Iizuka |
| 5,303,356 | A | 4/1994 | Vassiliadis et al. |
| 5,333,280 | A * | 7/1994 | Ishikawa et al. ............. 712/241 |
| 5,337,415 | A * | 8/1994 | DeLano et al. ............. 712/213 |
| 5,355,460 | A | 10/1994 | Eickemeyer et al. |
| 5,367,694 | A | 11/1994 | Ueno |
| 5,377,339 | A | 12/1994 | Saito et al. |
| 5,386,531 | A | 1/1995 | Blaner et al. |
| 5,398,321 | A | 3/1995 | Jeremiah |
| 5,404,469 | A | 4/1995 | Chung et al. |
| 5,442,760 | A * | 8/1995 | Rustad et al. ............... 712/215 |
| 5,442,762 | A | 8/1995 | Kato et al. |
| 5,446,850 | A | 8/1995 | Jeremiah et al. |
| 5,448,746 | A | 9/1995 | Eickemeyer et al. |
| 5,459,844 | A | 10/1995 | Eickemeyer et al. |
| 5,465,377 | A | 11/1995 | Blaner et al. |
| 5,471,593 | A | 11/1995 | Branigin |
| 5,475,853 | A | 12/1995 | Blaner et al. |
| 5,500,942 | A * | 3/1996 | Eickemeyer et al. ........ 712/210 |
| 5,502,826 | A | 3/1996 | Vassiliadis et al. |
| 5,504,932 | A | 4/1996 | Vassiliadis et al. |
| 5,506,974 | A | 4/1996 | Church et al. |
| 5,513,363 | A | 4/1996 | Kumar et al. |
| 5,664,135 | A | 9/1997 | Schlansker et al. |
| 5,689,428 | A | 11/1997 | Sauerbrey et al. |
| 5,689,653 | A | 11/1997 | Karp et al. |
| 5,692,139 | A | 11/1997 | Slavenburg et al. |
| 5,692,169 | A | 11/1997 | Kathail et al. |
| 5,701,430 | A | 12/1997 | Jeremiah et al. |
| 5,732,234 | A | 3/1998 | Vassiliadis et al. |
| 5,748,936 | A | 5/1998 | Karp et al. |
| 5,761,470 | A | 6/1998 | Yoshida |
| 5,778,219 | A | 7/1998 | Amerson |
| 5,819,088 | A * | 10/1998 | Reinders ..................... 709/102 |
| 5,864,692 | A | 1/1999 | Faraboschi et al. |
| 5,870,576 | A | 2/1999 | Faraboschi et al. |
| 5,881,260 | A | 3/1999 | Raje et al. |
| 5,881,280 | A | 3/1999 | Gupta et al. |
| 5,901,318 | A | 5/1999 | Hsu |
| 5,909,559 | A | 6/1999 | So |
| 5,922,065 | A | 7/1999 | Hull |
| 5,930,508 | A | 7/1999 | Faraboschi et al. |
| 5,933,850 | A | 8/1999 | Kumar et al. |
| 5,941,983 | A | 8/1999 | Gupta et al. |
| 5,943,499 | A | 8/1999 | Gillies et al. |
| 5,958,044 | A | 9/1999 | Brown et al. |
| 5,970,241 | A | 10/1999 | Deao et al. |
| 5,999,738 | A | 12/1999 | Schlansker et al. |
| 5,999,739 | A | 12/1999 | Soni et al. |
| 6,016,555 | A | 1/2000 | Deao et al. |
| 6,023,751 | A | 2/2000 | Schlansker et al. |
| 6,026,479 | A | 2/2000 | Fisher et al. |
| 6,029,240 | A | 2/2000 | Blaner et al. |
| 6,055,628 | A | 4/2000 | Seshan et al. |
| 6,055,649 | A | 4/2000 | Deao et al. |
| 6,058,474 | A | 5/2000 | Baltz et al. |
| 6,061,780 | A | 5/2000 | Shippy et al. |
| 6,065,106 | A | 5/2000 | Deao et al. |
| 6,078,940 | A | 6/2000 | Scales |
| 6,081,885 | A | 6/2000 | Deao et al. |
| 6,105,119 | A | 8/2000 | Kerr et al. |
| 6,105,123 | A | 8/2000 | Raje |
| 6,112,291 | A | 8/2000 | Scales et al. |
| 6,112,298 | A | 8/2000 | Deao et al. |
| 6,125,334 | A | 9/2000 | Hurd |
| 6,128,725 | A | 10/2000 | Leach |
| 6,145,027 | A | 11/2000 | Seshan et al. |
| 6,167,466 | A | 12/2000 | Nguyen et al. |
| 6,173,248 | B1 | 1/2001 | Brauch |
| 6,179,489 | B1 | 1/2001 | So et al. |
| 6,182,203 | B1 | 1/2001 | Simar, Jr. et al. |
| 6,195,756 | B1 | 2/2001 | Hurd |
| 6,219,796 | B1 | 4/2001 | Bartley |
| 6,219,833 | B1 | 4/2001 | Solomon et al. |
| 6,246,102 | B1 | 6/2001 | Sauerbrey et al. |
| 6,247,172 | B1 | 6/2001 | Dunn et al. |
| 6,253,359 | B1 | 6/2001 | Cano et al. |
| 6,260,190 | B1 | 7/2001 | Ju |
| 6,263,470 | B1 | 7/2001 | Hung et al. |
| 6,298,370 | B1 | 10/2001 | Tang et al. |
| 6,311,234 | B1 | 10/2001 | Seshan et al. |
| 6,314,431 | B1 | 11/2001 | Gornish |
| 6,314,560 | B1 | 11/2001 | Dunn et al. |
| 6,317,820 | B1 | 11/2001 | Shiell et al. |
| 6,321,318 | B1 | 11/2001 | Baltz et al. |
| 6,363,516 | B1 | 3/2002 | Cano et al. |
| 6,374,346 | B1 | 4/2002 | Seshan et al. |
| 6,374,403 | B1 | 4/2002 | Darte et al. |
| 6,378,109 | B1 | 4/2002 | Young et al. |
| 6,381,704 | B1 | 4/2002 | Cano et al. |
| 6,385,757 | B1 | 5/2002 | Gupta et al. |
| 6,408,428 | B1 | 6/2002 | Schlansker et al. |
| 6,438,747 | B1 | 8/2002 | Schreiber et al. |
| 6,442,701 | B1 | 8/2002 | Hurd |

OTHER PUBLICATIONS

Stevens, "An Introduction to the Hatfield Superscalar Scheduler", *Technical Report No. 316,* University of Herfordshire, Hatfield, Herts UK, Spring 1998.

Stevens et al., "iHARP: A Multiple Instruction Issue Processor", *Technical Report No. 125,* Hatfield Polytechnic, Nov. 1991.

Adams et al., "HARP: A Statically Scheduled Multiple–Instruction–Issue Architecture and its Compiler", *Technical Report 163,* University of Hertfordshire, Hatfield, Herts UK, pp. 1–8, Sep. 1993.

Arya et al., "An Architecture for High Instruction Level Parallelism", pp. 1–21, Jan. 1995.

Beck et al., "The Cydra 5 Minisupercomputer: Architecture and Implementation", *J. Supercomputing,* 7:143–179 (1993).

Butler, et al., "Single Instruction Stream Parallelism Is Greater than Two", 1991 ACM, pp. 276–286.

Chang et al., "Comparing Static and Dynamic Code Scheduling for Multiple–Instruction–Issue Processors", *Proceedings of the 24th International Symposium on Microarchitectures—MICRO24*, pp. 1–9, 1991.

Chen, "The Effect of Code Expanding Optimizations on Instruction Cache Design", *IEEE Transactions on Computers*, 42(9) pp. 1045–1057, Sep. 1993.

Colwell, et al., "A VLIW Architecture for a Trace Scheduling Compiler", *IEEE Transactions on Computers*, 37(8) pp. 967–979, Aug. 1988.

Conte, "Trade–Offs in Processor/Memory Interfaces for Superscalar Processors", MICRO–25, *The 25th Annual International Symposium on Microarchitecture*, Dec. 1992.

Dehnert et al., "Compiling for the Cydra 5", *J. Supercomputing*, 7, pp. 181–227, May 1993.

Fisher et al., "Instruction–Level Parallel Processing", *Science*, 253, pp. 1233–1241, Sep. 1991.

Fisher et al., "Parallel Processing: A Smart Compiler and a Dumb Machine", *ACM–Sigplan 84 Compiler Construction Conference*, 19(6), Jun. 1984.

Fisher, "Trace Scheduling: A Technique for Global Microcode Compaction", *IEEE Transactions on Computers*, C–30(7):478–490 Jul. 1981.

Fisher, "Very Long Instruction Word Architectures and the ELI–512", *Proceedings of the 10th Symposium on Computer Architecture*, ACM Press, pp. 140–150 (1983).

Gee et al., "Cache Performance of the SPEC92 Benchmark Suite", *IEEE MICRO*, pp. 17–27, Aug. 1993.

Gwennap, "Visionaries See Beyond Superscalar", *Microprocessor Report*, pp. 18–19, Dec. 6, 1993.

Hennessy et al., "Computer Technology and Architecture: An Evolving Interaction", *IEEE Computer*, pp. 18–29, Sep. 1991.

Hsu et al., "Highly Concurrent Scalar Processing", *13th International Symposium on Computer Architecture*, pp. Tokyo, 1986, pp. 1–10.

Johnson, "Superscalar Microprocessor Design", Prentice–Hall, Englewood Cliffs, New Jersey, 1991.

Karl, "Some Design Aspects of VLIW Architectures Exploiting Fine–Grained Parallelism", *Proceedings of the 5th International PARLE Conference*, pp. 582–599, Jun. 1993.

Lam et al., "Limits of Control Flow on Parallelism", *Computer Architecture News*, 20(2):46–57 (1992).

Lam, "Software Pipelining: An Effective Scheduling Technique for VLIW Machines", *Proceedings of ACM SIGPLAN '88 Conference on Programming Language Design and Implementation*, pp. 318–328, Jun. 1988.

Mahlke et al., "Effective Compiler Support for Predicated Execution Using the Hyperblock", MICRO 25, *Proceedings of the 25th Annual International Symposium on Microarchitectures*, IEEE Computer Society Press, pp. 45–54, Dec. 1992.

Mahlke et al., "Sentinel Scheduling for VLIW and Superscalar Processors", *In Proceedings of ASPLOS V*, 27(9) pp. 238–247, Sep. 1992.

Moon et al., "An Efficient Resource–Constrained Global Scheduling Technique for Superscalar and VLIW Processors", MICRO 25, *Proceedings of the 25th Annual International Symposium on Microarchitectures*, pp. 55–71, Dec. 1992.

Nicolau et al., "Measuring the Parallelism Available for Very Long Instruction Word Architectures", *IEEE Transactions on Computers*, C–33(11), pp. 968–976, Nov. 1984.

Oyang et al., "A Cost Effective Approach to Implement A Logn Instruction Word Microprocessor", *Computer Architecture News*, 18(1), Mar. 1990, pp. 59–72.

Pan et al., "Improving the Accuracy of Dynamic Branch Prediction Using Branch Correlation", *Fifth International Conference on Architectural Support for Programming Languages and Operating Systems* (ASPLOS–V), vol. 27, pp. 76–84 (1992).

Park et al., "On Predicated Execution", *Technical Report HPL–91–58*, Hewlett–Packard Laboratories May 1991.

Rau, "Cydra™ 5 Directed Dataflow Architecture", *Proceedings of COMPCON* 1988.

Rau, "Dynamic Scheduling Techniques for VLIW Processors", *Technical Report HPL–93–52*, Hewlett–Packard Laboratories, Jun. 1993.

Rau et al., "Efficient Code Generation for Horizontal Architectures: Compiler Techniques and Architectural Support", *Proceedings of the Ninth Annual International Symposium on Computer Architecture*, pp. 131–139, 1982.

Rau et al., "Instruction–Level Parallel Processing: History, Overview and Perspective", *J. Supercomputing*, vol. 7, pp. 9–50 (1993).

Rau, et al. (Editors), "Instruction–Level Parallelism", reprint from *J. Supercomputing*, 7(1/2), 1993.

Schutte et al., "Instruction–Level Experimental Evaluation of the Multiflow TRACE 14/300 VLIW Computer", *J. Supercomputing*, vol. 7, pp. 249–271 (1993).

Silberman et al, "An Architectural Framework for Supporting Heterogeneous Instruction–Set Architectures", *IEEE Computer*, 26(6), pp. 39–56, Jun. 1993.

Sites (Editor), "Alpha Architecture Reference Manual", Digital Press 1992.

Smith et al., "Boosting Beyond Static Scheduling in a Superscalar Processor", *IEEE Computer*, pp. 344–353, 1990.

Steven et al., "An Evaluation of the iHARP Multiple–Instruction–Issue Processor", Division of Computer Science, Univ. of Hertfordshire, Hatfield, Hertfordshire, pp. 1–8, Sep. 1995.

Stone et al., "Computer Architecture in the 1990s", *IEEE Computer*, pp. 30–37, Sep. 1991.

Tjaden et al., "Detection and Parallel Execution of Parallel Instructions", *IEEE Transactions on Computers*, C–19(10):889–895 Oct. 1970.

Uht, "Extraction of Massive Instruction Level Parallelism", *Computer Architecture News*, 21(3):5–12, Jun. 1993.

The SPARC Architecture Manual, Version 8, Prentice Hall, New Jersey, 1992.

Wall, "Limits of Instruction Level Parallelism", *Proceedings of the Fourth International Conference on Architectural Support for Programming Languages and Operation Systems*, pp. 176–188, Apr. 1991.

Warter et al., "Enhanced Modulo Scheduling for Loops With Conditional Branches", MICRO 25, *Proceedings of the 25th Annual International Symposium on Microarchitecture*, pp. 170–179 (1992).

Warter et al., "The Benefit of Predicated Execution for Software Pipelining", *HICSS–26 Conference Proceedings*, vol. 1, pp. 497–506, Jan. 1993.

Weaver et al. (Editors), "The SPARC Architecture Manual—Version 9", SPARC International Inc., PTR Prentice Hall, Englewood Cliffs, New Jersey, 1994.

Agerwala et al., "High Performance Reduced Instruction Set Processors", RC 12434 (#55845), *Computer Science*, Jan. 9, 1987.

Allison, DEC 7000/10000 Model 600 AXP Multiprocessor Server, *IEEE,* 1063–6309/93, pp. 456–464 (1993).

Bakoglu et al., "The IBM RISC system/6000 processor: hardware overview", *IBM J. Res. Develop.,* 34(1):12–22 (Jan., 1990).

Case et al., "DEC Enters Microprocessor Business With Alpha", *Microprocesosr Report,* 6(3):1,6–14, (Mar. 4, 1992).

Dutton, "The Design of the DEC 3000 Model 500 AXP Workstation", *IEEE,* 1063–6390/93, pp. 449–455 (1993).

Grove et al., "GEM Optimizing Compilers for Alpha AXP Systems", *IEEE,* 1063–6390/93, pp. 464–473 (1993).

Hennessy et al., "Computer Architecture: a Quantitative Approach", ISBN 1–55880–069–8, Morgan Kaufmann Publishers, Inc., San Mateo Calif. (1990) Table of Contents, pp. xi–xv.

Johnson, *"Superscalar Microprocessor Design",* Prentice–Hall 1991, pp. 233–235.

Minagawa et al., "Pre–decoding Mechanism for Superscalar Architecture", *IEEE Pacific Rim Conference on Communications, Computers and Signal Processing,* pp. 21–24 (May 9, 1991).

Anderson, D. W. et al.[1967] "The IBM 360 model 91: Processor philosophy and instruction handling." IBM J. Research and Development 11: 1 (Jan.) pp. 8–24.

Charlesworth, A.E., [1981]. "An approach to scientific processing: The architecture design of the AP–120B/FPS–164 family" Computer 14:9 (Sep.), pp. 18–27.

Colwell, R.P. et al. [1987]. "A VLIW archtiecture for a trace scheduling compiler." Proc. second Conf. on Architectural Support for Programming Languages and Operating Systems, IEFF/ACM (Mar.), pp. 180–192.

Dehnert, J.C. et al. [1989]. "Overlapped loop support on the Cydra 5." Proc. Third Conf. on Architectural Support for Programming Languages and Operating Systems, (Apr.), TEEE/ACM. Boston, pp. 26–39.

Rau, B.R., et al. [1989]. "The Cydra 5 departmental supercomputer: Design philosophies, decisions, and tradeoffs," IEEE Computers, 22:1 (Jan.), pp. 12–34.

Smith, J.E. [1989]. "Dynamic instruction scheduling and the astronautics ZS–I" Computer 22:7 (Jul.), pp. 21–25.

Smith, J.E. et al. [1987]. "The ZS–1 central processors," Proc. Second Conf. on Architectural Support for Programming Languages and Operating Systems, IEEE/ACM (Mar.), pp. 199–204.

Sohi, G.S. [1990]. "Instruction issue logic for high–performance, interruptible, multiple functional unit pipelined computers," IEEE Trans. on Cmputers 39:3 (Mar.), 349–359.

Sohi and Vajapeyam [1989]. "Tradeoffs in instruction format design for horizontal architectures," Proc. Second Conf. on Architectural Support for Programming Lanugages and Operating Systems, IEEE/ACM (Apr.), pp. 15–25.

Tomasulo, R.M. [1967], "An efficient algorithm for exploiting multiple arithmetic units," IBM J. Research and Development 11: 1 (Jan.), 25–33.

Weiss and Smith [1984]. "Instruction issue logic for pipelined supercomputers," Proc. 11th Symposium on Computer Architecture (Jun.) pp. 110–118.

De Gloria et al., "A Programmable Instruction Format Extension to VLIW Architectures", *Proceedings: Computer Systems and Software Engineering* The Hague, May 4–8, 1992 pp.:35–40.

Dorozhevets et al., "The El'brus–3 and MARS–M: Recent Advances in Russian High–Performance Computing", *The Journal of Supercomputing* 6(1):5–48 (1992).

Kato et al., "Delayed Instruction Execution On A Long Instruction Word (LIW) Computer", *Systems and Computers in Japan* 23(14):13–22 (1992).

Horst et al., "Multiple instruction issue in the nonstop cyclone processor" Proceedings of the 17th Annual International Symposium on Computer Architecture, IEEE Computer Society Press, Washington, (May 28–31, 1990) pp. 216–226.

Requa et al., "The piecewise data flow architecture; Architectural concepts" IEEE Transactions on Computers (1983) C–32(5):425–438.

Wang et al., "I–NET mechanism for issuing multiple instructions" Proceedings of Supercomputing IEEE Computer Society (Nov. 14–18, 1988) Orlando, Florida, pp. 88–95.

Allison et al., "National Unveils Superscalar RISC Processor," Microprocessor Report, vol. 5, No. 3, Feb. 20, 1991.

Alverson et al. The Tera computer system. In Conf. Proc., 1990 Intl. Conf. on Supercomputing, pp. 1–6, Amsterdam, The Netherlands.

Auslander "Managing programs and libraries in AIX version 3 for RISC System/6000 processors," IBM J. Res. Develop., 34:98–104 (1990).

Baker, T., "Headroom and Legroom in the 80960 Architecture," Proc. Compcon '90, San Francisco, Feb./Mar. 1990, pp. 299–306.

Bemis, P. The implimentation of an industrial strength cache based locally parallel reduced instruction set computers—the apolio dn10000. Electronic Imaging '88, International Electronic Imaging Exposition and Conference, IGC, Massachusetts, USA.

Blaner et al., "A Branch Instruction Processor for SCISM Organizations," IEEE Euromicro 95, Conf. Proc. pp. 285–293, Sep. 1995, Como, Italy.

Chang et al. "Evolution of storage facilities in AIX Version 3 for RISC System/6000 processors," IBM J. Res. Develop., 34:105–110 (1990).

CHoPP History original available at http://www.chopp.com (1990).

Chou et al., "Dual–ALU CRISC Architecture and its Compiling Technique," Computers Elect. Eng., vol. 17, No. 4., pp. 297–312 (1991).

Cockie "The evolution of RISC technology at IBM," IBM J. Res. Develop. 34: 4–11 (1990).

Colwell et al., "Architecure and Implementation of A VLIW Supercomputer," IEEE 1990 [16308DOC01765–1774].

Degloria et al., "A Boltzmann Machine Approach to code Optimization," Parallel Computing 17 (1991) 969–982.

Degloria et al., "A Non–Deterministic Scheduler for a Software Pipelining Complier," IEEE 1992.

DIEP et al., "Architecture Compatible Code Boosting for Performance Enhancement of the IBM RS/6000," 1993, pp. 86–93.

Donofrio "Preface, The IBM RISC System/6000 processor," IBM J. Res. Develop. 34: 2–3 (1990).

Ebcioglu et al., "A Compilation Technique for Software Pipelining of Loops with Conditional Jumps," ACM 1987, pp. 69–79.

Ebcioglu et al., "A New Compilation Technique for Parallelizing Loops with Unpredictable Brances on a VLIW Architecture," Languages and Compilers for Parallel Computing, pp. 213–229 (1990).

Ebcioglu, Kemal, "Some Design Ideas for a VLIW Architecture for Sequential Natured Software," Proceedings of the IFIP WG 10.3 Working Conf. on Parallel Processing, Pisa Italy, Apr. 25–27, 1988.
Ellis, John R., "Bulldog: A Compiler for VLIW Architectures," Ph.D. Dissertation, May 1985.
Essink et al., "Architecture and Programming of a VLIW Style Programmable Video Signal Processor" ACM (1991).
Fisher "The VLIW Machine: A multiprocessor for Compiling Scientific Code," IEEE Computer (1984).
Fisher, J.A., "Replacing Hardware that Thinks (Especially About Parallelism) with A Very Smart Compiler," Multiflow Computers, Inc. (1986).
Fox et al., "A Survey of General and Architecture–Specific Compiler Optimization Techniques," published on Internet 1992.
Fukuda et al., "Toward Advanced Parallel Processing: Exploiting Parallelism at Task and Instruction Levels," IEEE Micro, Aug. 1991, pp. 16–19, 50–60.
Gibbons, et al., "Efficient Instruction Scheduling for a Pipelined Architecture" ACM (1986).
Golumbic et al. "Instruction scheduling beyond basic blocks," IBM J. Res. Develop., 34:93–97 (1990).
Goodman et al. Code scheduling and register allocation in large basic blocks. In Conf. Proc., 1988 Conf. on Supercomputing, pp. 442–452, St. Malo, France.
Grimes et al. "The Intel i860 64–bit Processor: General Purpose CPU with 3D Graphics Capabilities," IEEC Computer Graphics and Applications pp. 85–94 (1989).
Grohoski "Machine organization of the IBM RISC System/6000 processor," IBM J. Res. Develop., 34: 37–58 (1990).
Grohoski et al. "Branched and Fixed—Point Instruction Execution Units," IBM RISC System/6000 Technology 1990, pp. 24–32.
Groves et al., "RISC System/6000 Processor Architecture," Microprocessors and Microsystems, vol. 14, No. 6, Jul/Aug. 1990, pp. 357–368.
Gupta et al., "Compilation Techniques for a Reconfigurable LIW Architecture," Journal of Supercomputing, 3, 271–304 (1989).
Ha et al. "Compile–Time Scheduling and Assignment of Data–Flow Program Graphs with Data–Dependent Iteration," IEEE Transaction on Computers, 40:1225–1238 (1991).
Higbie, L.C., "Overlapped Operation with Microprogramming," IEEE Trans. on Computers, vol. C–27, No. 3, Mar. 1978, pp. 270–274.
Hokenek et al. "Leading–zero anticipator (LZA) in the IBM RISC System/6000 floating–point execution unit," IBM J. Res. Develop., 34:71–77 (1990).
Hwu et. al. The superblock: An effective technique for VLIW and superblock compilation. Journal of Supercomputing, 7:229–248 (1993).
Intel i860 chipset product datasheet (2001).
Johnson "Super–scaler Processor Design," Stanford University Department of Electrical Engineering dissertation for Phd. (1989).
Kathail et al., "HPL–PD Architecure Specification: Verson 1.0," HP Lab Reports (2000).
Keuhn et al., "The Horizon Supercomputing System: Architecture Software," Supercomputing '88, pp. 28–34. IEEE (1988).
Kohn et al. Introducing the Intel i860 64–bit microprocessor. IEEE Micro, 9(4):15–30 (1989).

Kohn et al. "The i860 64–Bit Super Computing Microprocessor," Proceedings on Supercomputing pp. 405–456 (1989).
Lichtenstein, "The Architecture of the Culler 7," Compcon '86 pp 467–470 (1986).
Lowney et al., "The Multiflow Trace Scheduling Compiler," The Journal of Supercomputing, 7, 51–142 (1993).
Malik et al., "Architectural Effects on Dual Instruction Issue with Interlock Collapsing ALUs," IEEE 1993.
Malik et al., "Execution Dependencies and Their Resolution In Fine Grain Parallel Machines," IEEE 1993.
Mankovich et al. "CHoPP Principles of Operation," Processor ICS pp. 2–10 (1987).
Mankovich et al. "Designing and Programming the CHoPP Supercomputer," Supercomputer Architectures pp. 106–137 (1990).
Margulis "i860 Microprocessor Internal Architecture," International Specialist Seminar, Apr. 11–15, 1988.
Markstein "Computation of elementary functions on the IBM RISC System/6000 processor," IBM J. Res. Develop., 34:111–119 (1990).
May, D., "The T9000 Transputer," 1993 IEEE International Conference on Computer Design: VLSI in Computers & Processors (1993).
McGeady, Steve, "Inside Intel's i960CA Superscalar Processor," Microprocessors and Microsystems, vol. 14, No. 6, Jul/Aug. 1990, pp. 385–396.
Montoye et al. "Design of the IBM RISC System/6000 floating–point execution unit," IBM J. Res. Develop., 34:59–70 (1990).
Nakatani, et al., "Combining' as a Compilation Technique for VLIW Architectures" ACM (1990).
Oehler et al. "IBM RISC System/6000 processor architecture," IBM J. Res. Develop., 34:23–36 (1990).
Perry "Intel's Secret is Out," IEEE Spectrum pp 22–28 (1989).
Popescu, V., et al., "The Metaflow Architecture," IEEE Micro (1990).
Ratiu et al. "Pseudorandom built–in self–test methodology and implementation for the IBM RISC System/6000 processor," IBM J. Res. Develop., 34: 78–84 (1990).
Rau, B., "Dynamically Scheduled VLIW Processors," IEEE 1993.
Sano, B., "The 16–Fold Way: A Microparallel Taxonomy," 1992 IEEE International Conference on Computer Design: VLSI in Computers & Processors (1993).
Smith "The Architecture of the Intel 860," MIPS pp. 53–56 (1989).
Smotherman "Culler 7," available online at http://www.paralogos.com/DeadSuper/Culler/index.html (1998).
Spee et al., "Evaluation of the Continuation Bit in the Cyclic Pipeline Computer," Parallel Computing 18, pp. 1349–1361 (1992).
Thistle et al.; "A Processor Architecture For Horizon," Supercomputing '88, pp. 35–41 IEEE (1988).
Touzeau, Roy F., "A Fortran Compiler For The FPS–164 Scientific Computer," Proceedings of the AGM SIGPLAN '84 Symposium on Complier Construction, SIGPLAN Notices, vol. 19, No. 6 (1984).
Tyson, G., et al., "Techniques for Extracting Instruction Level Parallelism on MIMD Architectures" [16309DOC00622–631], undated.

Vassiliadis et al., "In–Cache Pre–Processing and Decode Mechanisms for Fine Grain Parallelism in SCISM," 12th Ann. Int'l. Phoenix Conf. on Computers and Comm., Tempe, Ariz., pp. 91–97, Mar. 1993.

Vassiliadis et al., "On the Attributes of the SCISM Organization," Computer Architecture News, vol. 20, No. 4, pp. 44–53, Sep. 1992.

Vassiliadis et al., "SCIMS: A Scalable Compound Instruction Set Machine," IBM J. Res. Development, vol. 38, No. 1, Jan. 1994, pp. 59–78.

Wang, "Distributed Instruction Set Computer Architecture," IEEE Transactions on Computers 40:915–934 (1991).

Warren, "Instruction scheduling for the IBM RISC System/6000 processor," IBM J. Res. Develop., 34: 85–92 (1990).

Prior Art Claims Charts, "The Asserted 5,560,028 Claims are Invalid over the Multiflow System," submitted in U.S. District Court, Eastern District of Texas, Marshall Division Case No.:2–01CV160 filed Jul. 30, 2001.

Prior Art Claims Charts, "The Asserted 5,560,028 Claims are Invalid over the Phillips System," submitted in U.S. District Court, Eastern District of Texas, Marshall Division Case No.:2–01CV160 filed Jul. 30, 2001.

Prior Art Claims Charts, "The Asserted 5,560,028 Claims are Invalid over the IBM SCISM System," submitted in U.S. District Court, Eastern District of Texas, Marshall Division Case No.:2–01CV160 filed Jul. 30, 2001.

Prior Art Claims Charts, "The Asserted 5,794,003 Claims are Invalid over the Multiflow System," submitted in U.S. District Court, Eastern District of Texas, Marshall Division Case No.:2–01CV160 filed Jul. 30, 2001.

Prior Art Claims Charts, "The Asserted 5,794,003 Claims are Invalid over the Phillips System," submitted in U.S. District Court, Eastern District of Texas, Marshall Division Case No.:2–01CV160 filed Jul. 30, 2001.

Prior Art Claims Charts, "The Asserted 5,794,003 Claims are Invalid over the IBM SCISM System," submitted in U.S. District Court, Eastern District of Texas, Marshall Division Case No.:2–01CV160 filed Jul. 30, 2001.

Prior Art Claims Charts, "U.S. Appl. No. 5,560,028 compared to the Intel i860," submitted in U.S. District Court, Eastern District of Texas, Marshall Division Case No.:2–01CV160 filed Jul. 30, 2001.

Prior Art Claims Charts, "U.S. Appl. No. 5,560,028 compared to the Culler 7," submitted in U.S. District Court, Eastern District of Texas, Marshall Division Case No.:2–01CV160 filed Jul. 30, 2001.

Prior Art Claims Charts, "U.S. Appl. No. 5,794,003 compared to the Culler 7," submitted in U.S. District Court, Eastern District of Texas, Marshall Division Case No.:2–01CV160 filed Jul. 30, 2001.

Prior Art Claims Charts, "U.S. Appl. No. 5,560,028 compared to the CHoPP," submitted in U.S. District Court, Eastern District of Texas, Marshall Division Case No.:2–01CV160 filed Jul. 30, 2001.

Prior Art Claims Charts, "U.S. Appl. No. 5,794,003 compared to the CHoPP," submitted in U.S. District Court, Eastern District of Texas, Marshall Division Case No.:2–01CV160 filed Jul. 30, 2001.

Prior Art Claims Charts, "U.S. Appl. No. 5,560,028 compared to the Apollo DN10000," submitted in U.S. District Court, Eastern District of Texas, Marshall Division Case No.:2–01CV160 filed Jul. 30, 2001.

Prior Art Claims Charts, "U.S. Appl. No. 5,794,003 compared to the Apollo DN10000," submitted in U.S. District Court, Eastern District of Texas, Marshall Division Case No.:2–01CV160 filed Jul. 30, 2001.

Prior Art Claims Charts, "U.S. Appl. No. 5,560,028 compared to the Apollo Cydra 5," submitted in U.S. District Court, Eastern District of Texas, Marshall Division Case No.:2–01CV160 filed Jul. 30, 2001.

Prior Art Claims Charts, "U.S. Appl. No. 5,794,003 compared to the Apollo Cydra 5," submitted in U.S. District Court, Eastern District of Texas, Marshall Division Case No.:2–01CV160 filed Jul. 30, 2001.

Prior Art Claims Charts, "U.S. Appl. No. 5,560,028 compared to U.S. Appl. No. 5,021,945," submitted in U.S. District Court, Eastern District of Texas, Marshall Division Case No.:2–01CV160 filed Jul. 30, 2001.

Prior Art Claims Charts, "U.S. Appl. No. 5,794,003 compared to U.S. Appl. No. 5,021,945," submitted in U.S. District Court, Eastern District of Texas, Marshall Division Case No.:2–01CV160 filed Jul. 30, 2001.

Prior Art Claims Charts, "U.S. Appl. No. 5,560,028 compared to U.S. Appl. No. 5,377,339," submitted in U.S. District Court, Eastern District of Texas, Marshall Division Case No.:2–01CV160 filed Jul. 30, 2001.

Prior Art Claims Charts, "U.S. Appl. No. 5,794,003 compared to U.S. Appl. No. 5,377,339," submitted in U.S. District Court, Eastern District of Texas, Marshall Division Case No.:2–01CV160 filed Jul. 30, 2001.

Finding of Fact and Conclusion of Law from Distric Court Judge Ward regarding validity of a patent and related applications from U.S. District Court, Eastern District of Texas, Marshall Division Case No.:2–01CV160, dated Oct. 10, 2002.

* cited by examiner

```
S =   0     0     0     0     0     0     0     0
    | W0  | W1  | W2  | W3  | W4  | W5  | W6  | W7  |
    [                     GROUP 0                    ]
```

*FIG. 5A*

```
S =   0     0     1     1     1     0     0     0
    | W0  | W1  | W2  | W3  | W4  | W5  | W6  | W7  |
    [ GROUP 0 ]  [    GROUP 1    ]  [   GROUP 2    ]
```

```
  63  59 56                                        0
 | P | S |            INSTRUCTION                  |
   4   3                    57
```

*FIG. 6*

GROUP TAG

CLOCK 1 —  ALU     ALU     LOAD    STORE

CLOCK 2 —  LOAD    FP      FP

CLOCK 3 —  BRANCH

VLIW PROCESSOR AND METHOD THEREFOR

CROSS REFERENCE TO RELATED APPLICATIONS

This is a continuation of U.S. application Ser. No. 08/754,337 filed Nov. 22, 1996, now U.S. Pat. No. 5,794,003; which is a continuation of U.S. application Ser. No. 08/498,135, filed Jul. 5, 1995, now abandoned, which is a continuation of U.S. application Ser. No. 08/147,797 filed Nov. 5, 1993, now abandoned.

BACKGROUND OF THE INVENTION

This invention relates to the architecture of computing systems, and in particular to an architecture in which individual instructions may be executed in parallel, as well as to methods and apparatus for accomplishing that.

A common goal in the design of computer architectures is to increase the speed of execution of a given set of instructions. One approach to increasing instruction execution rates is to issue more than one instruction per clock cycle, in other words, to issue instructions in parallel. This allows the instruction execution rate to exceed the clock rate. Computing systems that issue multiple independent instructions during each clock cycle must solve the problem of routing the individual instructions that are dispatched in parallel to their respective execution units. One mechanism used to achieve this parallel routing of instructions is generally called a "crossbar switch."

In present state of the art computers, e.g. the Digital Equipment Alpha, the Sun Microsystems SuperSparc, and the Intel Pentium, the crossbar switch is implemented as part of the instruction pipeline. In these machines the crossbar is placed between the instruction decode and instruction execute stages. This is because the conventional approach requires the instructions to be decoded before it is possible to determine the pipeline to which they should be dispatched. Unfortunately, decoding in this manner slows system speed and requires extra surface area on the integrated circuit upon which the processor is formed. These disadvantages are explained further below.

This invention relates to the architecture of computing systems, and in particular to an architecture in which groups of instructions may be executed in parallel, as well as to methods and apparatus for accomplishing that.

A common goal in the design of computer architectures is to increase the speed of execution of a given set of instructions. Many solutions have been proposed for this problem, and these solutions generally can be divided into two groups.

According to a first approach, the speed of execution of individual instructions is increased by using techniques directed to decreasing the time required to execute a group of instructions serially. Such techniques include employing simple fixed-width instructions, pipelined execution units, separate instruction and data caches, increasing the clock rate of the instruction processor, employing a reduced set of instructions, using branch prediction techniques, and the like. As a result it is now possible to reduce the number of clocks to execute an instruction to approximately one. Thus, in these approaches, the instruction execution rate is limited to the clock speed for the system.

To push the limits of instruction execution to higher levels, a second approach is to issue more than one instruction per clock cycle, in other words, to issue instructions in parallel. This allows the instruction execution rate to exceed the clock rate. There are two classical approaches to parallel execution of instructions.

Computing systems that fetch and examine several instructions simultaneously to find parallelism in existing instruction streams to determine if any can be issued together are known as superscaler computing systems. In a conventional superscaler system, a small number of independent instructions are issued in each clock cycle. Techniques are provided, however, to prevent more than one instruction from issuing if the instructions fetched are dependent upon each other or do not meet other special criteria. There is a high hardware overhead associated with this hardware instruction scheduling process. Typical superscaler machines include the Intel i960CA, the IBM RIOS, the Intergraph Clipper C400, the Motorola 88110, the Sun SuperSparc, the Hewlett-Packard PA-RISC 7100, the DEC Alpha, and the Intel Pentium.

Many researchers have proposed techniques for superscaler multiple instruction issue. Agerwala, T., and J. Cocke [1987] "High Performance Reduced Instruction Set Processors," IBM Tech. Rep. (March), proposed this approach and coined the name "superscaler." IBM described a computing system based on these ideas, and now manufactures and sells that machine as the RS/6000 system. This system is capable of issuing up to four instructions per clock and is described in "The IBM RISC System/6000 Processor," IBM J. of Res. & Develop. (January, 1990) 34:1.

The other classical approach to parallel instruction execution is to employ a "wide-word" or "very long instruction word" (VLIW) architecture. A VLIW machine requires a new instruction set architecture with a wide-word format. A VLIW format instruction is a long fixed-width instruction that encodes multiple concurrent operations. VLIW systems use multiple independent functional units. Instead of issuing multiple independent instructions to the units, a VLIW system combines the multiple operations into one very long instruction. For example, in a VLIW system, multiple integer operations, floating point operations, and memory references may be combined in a single "instruction." Each VLIW instruction thus includes a set of fields, each of which is interpreted and supplied to an appropriate functional unit. Although the wide-word instructions are fetched and executed sequentially, because each word controls the entire breadth of the parallel execution hardware, highly parallel operation results. Wide-word machines have the advantage of scheduling parallel operation statically, when the instructions are compiled. The fixed width instruction word and its parallel hardware, however, are designed to fit the maximum parallelism that might be available in the code, and most of the time far less parallelism is available in the code. Thus for much of the execution time, most of the instruction bandwidth and the instruction memory are unused.

There is often a very limited amount of parallelism available in a randomly chosen sequence of instructions, especially if the functional units are pipelined. When the units are pipelined, operations being issued on a given clock cycle cannot depend upon the outcome of any of the previously issued operations already in the pipeline. Thus, to efficiently employ VLIW, many more parallel operations are required than the number of functional units.

Another disadvantage of VLIW architectures which results from the fixed number of slots in the very long instruction word for classes of instructions, is that a typical VLIW instruction will contain information in only a few of its fields. This is inefficient, requiring the system to be designed for a circumstance that occurs only rarely—a fully populated instruction word.

Another disadvantage of VLIW systems is the need to increase the amount of code. Whenever an instruction is not full, the unused functional units translate to wasted bits, no-ops, in the instruction coding. Thus useful memory and/or instruction cache space is filled with useless no-op instructions. In short, VLIW machines tend to be wasteful of memory space and memory bandwidth except for only a very limited class of programs.

The term VLIW was coined by J. A. Fisher and his colleagues in Fisher, J. A., J. R. Ellis, J. C. Ruttenberg, and A. Nicolau [1984], "Parallel Processing: A Smart Compiler and a Dumb Machine," Proc. SIGPLAN Conf. on Compiler Construction (June), Palo Alto, Calif., 11–16. Such a machine was commercialized by Multiflow Corporation.

For a more detailed description of both superscaler and VLIW architectures, see Computer Architecture—a Quantitative Approach, John L. Hennessy and David A. Patterson, Morgan Kaufmann Publishers, 1990.

BRIEF SUMMARY OF THE INVENTION

We have developed a computing system architecture that enables instructions to be routed to an appropriate pipeline more quickly, at lower power, and with simpler circuitry than previously possible. This invention places the crossbar switch earlier in the pipeline, making it a part of the initial instruction fetch operation. This allows the crossbar to be a part of the cache itself, rather than a stage in the instruction pipeline. It also allows the crossbar to take advantage of circuit design parameters that are typical of regular memory structures rather than random logic. Such advantages include: lower switching voltages (200–300 milliamps rather than 3–5 volts); more compact design, and higher switching speeds. In addition, if the crossbar is placed in the cache, the need for many sense amplifiers is eliminated, reducing the circuitry required in the system as a whole.

To implement the crossbar switch, the instructions coming from the cache, or otherwise arriving at the switch, must be tagged or otherwise associated with a pipeline identifier to direct the instructions to the appropriate pipeline for execution. In other words, pipeline dispatch information must be available at the crossbar switch at instruction fetch time, before conventional instruction decode has occurred. There are several ways this capability can be satisfied: In one embodiment this system includes a mechanism that routes each instruction in a set of instructions to be executed in parallel to an appropriate pipeline, as determined by a pipeline tag applied to each instruction during compilation, or placed in a separate identifying instruction that accompanies the original instruction. Alternately the pipeline affiliation can be determined after compilation at the time that instructions are fetched from memory into the cache, using a special predecoder unit.

Thus, in one implementation, this system includes a register or other means, for example, the memory cells providing for storage of a line in the cache, for holding instructions to be executed in parallel. Each instruction has associated with it a pipeline identifier indicative of the pipeline to which that instruction is to be issued. A crossbar switch is provided which has a first set of connectors coupled to receive the instructions, and a second set of connectors coupled to the processing pipelines to which the instructions are to be dispatched for execution. Means are provided which are responsive to the pipeline identifiers of the individual instructions in the group supplied to the first set of connectors for routing those individual instructions onto appropriate paths of the second set of connectors, thereby supplying each instruction in the group to be executed in parallel to the appropriate pipeline.

In a preferred embodiment of this invention the associative crossbar is implemented in the instruction cache. By placing the crossbar in the cache all switching is done at low signal levels (approximately 200–300 millivolts). Switching at these low levels is substantially faster than switching at higher levels (5 volts) after the sense amplifiers. The lower power also eliminates the need for large driver circuits, and eliminates numerous sense amplifiers. Additionally by implementing the crossbar in the cache, the layout pitch of the crossbar lines matches the pitch of the layout of the cache.

We have developed a computing system architecture, which we term software-scheduled superscaler, which enables instructions to be executed both sequentially and in parallel, yet without wasting space in the instruction cache or registers. Like a wide-word machine, we provide for static scheduling of concurrent operations at program compilation. Instructions are also stored and loaded into fixed width frames (equal to the width of a cache line). Like a superscaler machine, however, we employ a traditional instruction set, in which each instruction encodes only one basic operation (load, store, etc.). We achieve concurrence by fetching and dispatching "groups" of simple individual instructions, arranged in any order. The architecture of our invention relies upon the compiler to assign instruction sequence codes to individual instructions at the time they are compiled. During execution these instruction sequence codes are used to sort the instructions into appropriate groups and execute them in the desired order. Thus our architecture does not suffer the high hardware overhead and run-time constraints of the superscaler strategy, nor does it suffer the wasted instruction bandwidth and memory typical of VLIW systems.

Our system includes a mechanism, an associative crossbar, which routes in parallel each instruction in an arbitrarily selected group to an appropriate pipeline, as determined by a pipeline tag applied to that instruction during compilation. Preferably, the pipeline tag will correspond to the type of functional unit required for execution of that instruction, e.g., floating point unit 1. All instructions in a selected group can be dispatched simultaneously.

Thus, in one implementation, our system includes a cache line, register, or other means for holding at least one group of instructions to be executed in parallel, each instruction in the group having associated therewith a pipeline identifier indicative of the pipeline for executing that instruction and a group identifier indicative of the group of instructions to be executed in parallel. The group identifier causes all instructions having the same group identifier to be executed simultaneously, while the pipeline identifier causes individual instructions in the group to be supplied to an appropriate pipeline.

In another embodiment the register holds multiple groups of instructions, and all of the instructions in each group having a common group identifier are placed next to each other, with the group of instructions to be executed first placed at one end of the register, and the instructions in the group to be executed last placed at the other end of the register.

In another embodiment of our invention a method of executing arbitrary numbers of instructions in a stream of instructions in parallel includes the steps of compiling the instructions to determine which instructions can be executed simultaneously, assigning group identifiers to sets of instructions that can be executed in parallel, determining a pipeline for execution of each instruction, assigning a pipeline identifier to each instruction, and placing the instructions in a cache line or register for execution by the pipelines.

BRIEF DESCRIPTION OF THE DRAWINGS

FIG. 5a illustrates the frame structure for one maximum-sized group of eight instructions;

FIG. 5b illustrates the frame structure for a typical mix of three intermediate sized group of instructions;

FIG. 5c illustrates the frame structure for eight minimum-sized groups, each of one instruction;

FIG. 6 illustrates an instruction word after predecoding;

DETAILED DESCRIPTION OF THE INVENTION

Figure 1:
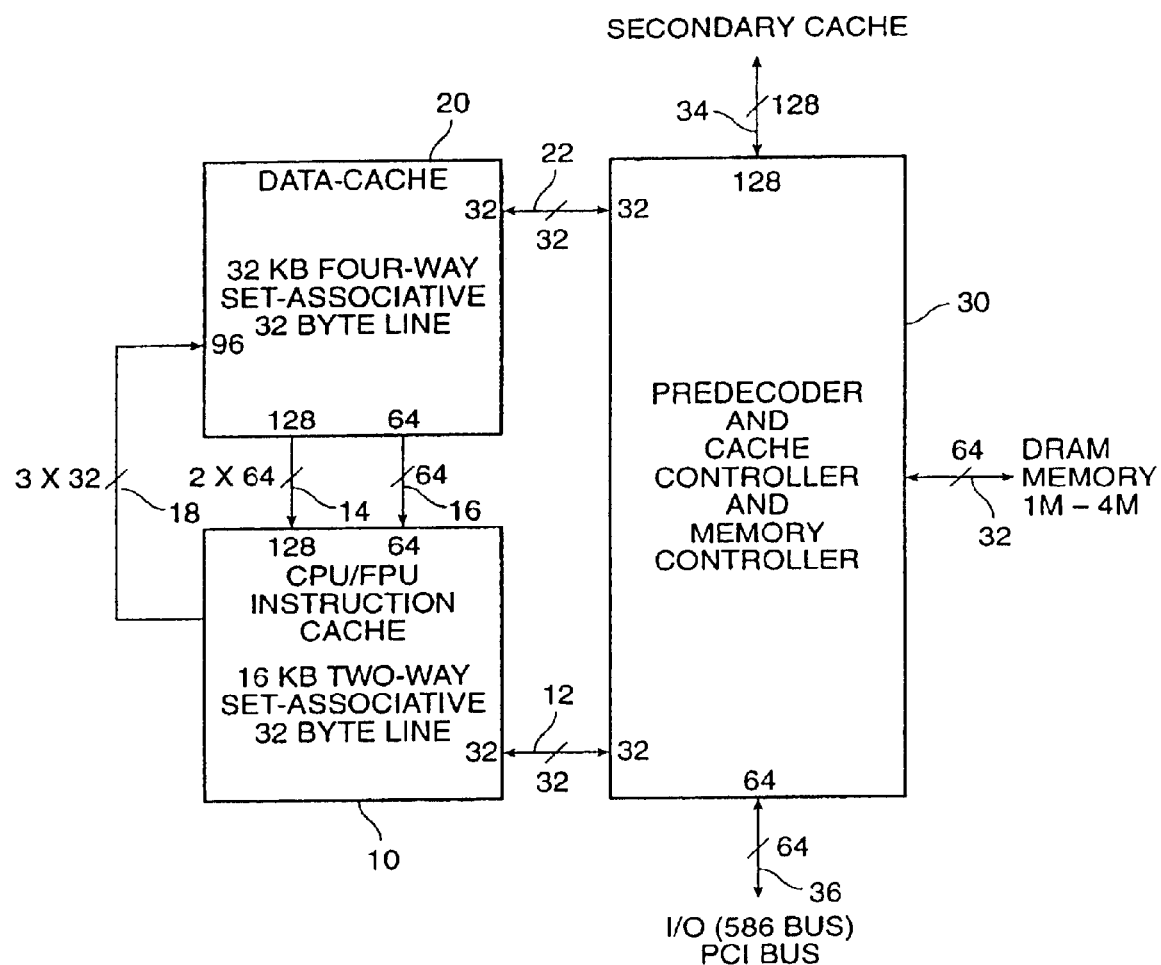
FIG. 1 is a block diagram illustrating a typical environment for a preferred implementation of this invention.

FIG. 1 is a block diagram of a computer system incorporating the associative crossbar switch according to the preferred embodiment of this invention. The following briefly describes the overall preferred system environment within which the crossbar is incorporated. For additional information about the system, see copending U.S. patent application Ser. No. 08/147,800, filed Nov. 5, 1993, and entitled "Software Scheduled Superscaler Computer Architecture," which is incorporated by reference herein. FIG. 1 illustrates the organization of the integrated circuit chips by which the computing system is formed. As depicted, the system includes a first integrated circuit 10 that includes a central processing unit, a floating point unit, and an instruction cache.

In the preferred embodiment the instruction cache is a 16 kilobyte two-way set-associative 32 byte line cache. A set associative cache is one in which the lines (or blocks) can be placed only in a restricted set of locations. The line is first mapped into a set, but can be placed anywhere within that set. In a two-way set associative cache, two sets, or compartments, are provided, and each line can be placed in one compartment or the other.

The system also includes a data cache chip 20 that comprises a 32 kilobyte four-way set-associative 32 byte line cache. The third chip 30 of the system includes a predecoder, a cache controller, and a memory controller. The predecoder and instruction cache are explained further below. For the purposes of this invention, the CPU, FPU, data cache, cache controller and memory controller all may be considered of conventional design.

The communication paths among the chips are illustrated by arrows in FIG. 1. As shown, the CPU/FPU and instruction cache chip communicates over a 32 bit wide bus 12 with the predecoder chip 30. The asterisk is used to indicate that these communications are multiplexed so that a 64 bit word is communicated in two cycles. Chip 10 also receives information over 64 bit wide buses 14, 16 from the data cache 20, and supplies information to the data cache 20 over three 32 bit wide buses 18. The predecoder decodes a 32 bit instruction received from the secondary cache into a 64 bit word, and supplies that 64 bit word to the instruction cache on chip 10.

The specific functions of the predecoder are described in much greater detail below; however, essentially it functions to decode a 32 bit instruction received from the secondary cache into a 64 bit word, and to supply that 64 bit word to the instruction cache on chip 10.

The cache controller on chip 30 is activated whenever a first level cache miss occurs. Then the cache controller either goes to main memory or to the secondary cache to fetch the needed information. In the preferred embodiment the secondary cache lines are 32 bytes and the cache has an 8 kilobyte page size.

The data cache chip 20 communicates with the cache controller chip 30 over another 32 bit wide bus. In addition, the cache controller chip 30 communicates over a 64 bit wide bus 32 with the DRAM memory, over a 128 bit wide bus 34 with a secondary cache, and over a 64 bit wide bus 36 to input/output devices.

As will be described further below, the system shown in FIG. 1 includes multiple pipelines able to operate in parallel on separate instructions which are dispatched to these parallel pipelines simultaneously. In one embodiment the parallel instructions have been identified by the compiler and tagged with a pipeline identification tag indicative of the specific pipeline to which that instruction should be dispatched.

As will be described, the system shown in FIG. 1 includes both conventional and novel features. The system includes multiple pipelines able to operate in parallel on separate instructions. The instructions that can be dispatched to these parallel pipelines simultaneously, in what we term "instruction groups," have been identified by the compiler and tagged with a group identification tag. Thus, the group tag designates instructions that can be executed simultaneously. Instructions within the group are also tagged with a pipeline tag indicative of the specific pipeline to which that instruction should be dispatched. This operation is also performed by the compiler.

In this system, an arbitrary number of instructions can be executed in parallel. In one embodiment of this system the central processing unit includes eight functional units and is capable of executing eight instructions in parallel. These pipelines are designated using the digits 0 to 7. Also, for this explanation each instruction word is assumed to be 32 bits (4 bytes) long.

In this system, each group of instructions can contain an arbitrary number of instructions ordered in an arbitrary sequence. The only limitation is that all instructions in the group must be capable of simultaneous execution; e.g., there cannot be data dependency between instructions. The instruction groups are collected into larger sets and are organized into fixed width "frames" and stored. Each frame can contain a variable number of tightly packed instruction groups, depending upon the number of instructions in each group and on the width of the frame.

Below we describe this concept more fully, as well as describe a mechanism to route in parallel each instruction in an arbitrarily selected group to its appropriate pipeline, as determined by the pipeline tag of the instruction.

In the following description of the word, group, and frame concepts mentioned above, specific bit and byte widths are used for the word, group and frame. It should be appreciated that these widths are arbitrary, and can be varied as desired. None of the general mechanisms described for achieving the result of this invention depends upon the specific implementation.

Figure 2:
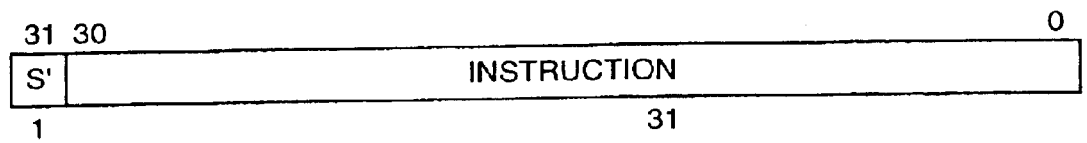
FIG. 2 is a diagram illustrating the data structure of an instruction word in this system.

In one embodiment of this system the central processing unit includes eight functional units and is capable of executing eight instructions in parallel. We designate these pipelines using the digits 0 to 7. Also, for this explanation each instruction word is 32 bits (4 bytes) long, with a bit, for example, the high order bit S being reserved as a flag for group identification. FIG. 2 therefore shows the general format of all instructions. As shown by FIG. 2, bits 0 to 30 represent the instruction, with the high order bit 31 reserved to flag groups of instructions, i.e., collections of instructions the compiler has determined may be executed in parallel.

Figure 3:
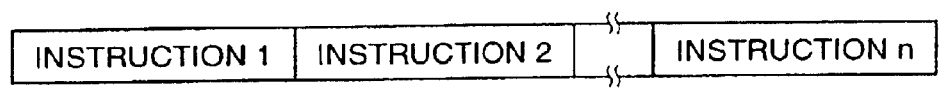
FIG. 3 is a diagram illustrating a group of instruction words.

FIG. 3 illustrates a group of instructions. A group of instructions consists of one to eight instructions (because there are eight pipelines in the preferred implementation) ordered in any arbitrary sequence; each of which can be dispatched to a different parallel pipeline simultaneously.

Figure 4:
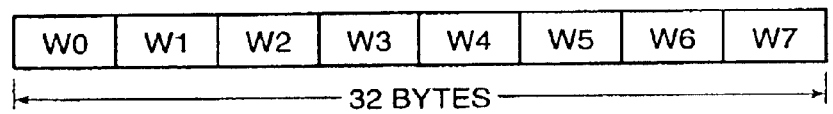
FIG. 4 is a diagram illustrating a frame containing from one to eight groups of instructions.

FIG. 4 illustrates the structure of an instruction frame. In the preferred embodiment an instruction frame is 32 bytes wide and can contain up to eight instruction groups, each comprising from one to eight instructions. This is explained further below.

When the instruction stream is compiled before execution, the compiler places instructions in the same group next to each other in any order within the group and then places that group in the frame. The instruction groups are ordered within the frame from left to right according to their issue sequence. That is, of the groups of instructions in the frame, the first group to issue is placed in the leftmost position, the second group to issue is placed in the next position to the right, etc. Thus, the last group of instructions to issue within that frame will be placed in the rightmost location in the frame. As explained, the group affiliation of all instructions in the same group is indicated by setting the S bit (bit 31 in FIG. 2) to the same value. This value toggles back and forth from 0 to 1 to 0, etc., between adjacent groups to thereby identify the groups. Thus, all instructions in the first group in a frame have the S bit set to 0, all instructions in the second group have the S bit set to 1, all instructions in the third group have the S bit set to 0, etc., for all groups of instructions in the frame.

To clarify the use of a frame, FIG. 5 illustrates three different frame structures for different hypothetical groups of instructions. In FIG. 5a the frame structure for a group of eight instructions, all of which can be issued simultaneously, is shown. The instruction words are designated W0, W1, . . . , W7. The S bit for each one of the instruction words has been set to 0 by the compiler, thereby indicating that all eight instructions can be issued simultaneously.

FIG. 5b illustrates the frame structure for a typical mixture of three intermediate sized groups of instructions. In FIG. 5b these three groups of instructions are designated Group 0, Group 1 and Group 2. Shown at the left-hand side of FIG. 5b is Group 0 that consists of two instruction words W0 and W1. The S bits for each of these instructions has been set to 0. Group 1 of instructions consists of three instruction words, W2, W3 and W4, each having the S bit set to 1. Finally, Group 2 consists of three instruction words, W5, W6 and W7, each having its S bit set to 0.

FIG. 5c illustrates the frame structure for eight minimum sized groups, each consisting of a single instruction. Because each "group" of a single instruction must be issued before the next group, the S bits toggle in a sequence 01010101 as shown.

As briefly mentioned above, in the preferred embodiment the pipeline identifiers are associated with individual instructions in a set of instructions during compilation, and in the preferred embodiment the group identifiers are associated with individual instructions in a group during compilation. In the preferred embodiment, this is achieved by compiling the instructions to be executed using a well-known compiler technology. During the compilation, the instructions are checked for data dependencies, dependence upon previous branch instructions, or other conditions that preclude their execution in parallel with other instructions. These steps are performed using a well-known compiler. The result of the compilation is identification of a set or group of instructions which can be executed in parallel. The result of the compilation is a group identifier being associated with each instruction. It is not necessary that the group identifier be added to the instruction as a tag, as shown in the preferred embodiment and described further below. In an alternative approach, the group identifier is provided as a separate tag that is later associated with the instruction. This makes possible the execution of programs on our system, without need to revise the word width. In addition, in the preferred embodiment, the compiler determines the appropriate pipeline for execution of an individual instruction. This determination is essentially a determination of the type of instruction provided. For example, load instructions will be sent to the load pipeline, store instructions to the store pipeline, etc. The association of the instruction with the given pipeline can be achieved either by the compiler, or by later examination of the instruction itself, for example, during predecoding.

Referring again to FIG. 1, in normal operation the CPU will execute instructions from the instruction cache according to well-known principles. On an instruction cache miss, however, a set of instructions containing the instruction missed is transferred from the main memory into the secondary cache and then into the primary instruction cache, or from the secondary cache to the primary instruction cache, where it occupies one line of the instruction cache memory. Because instructions are only executed out of the instruction cache, all instructions ultimately undergo the following procedure.

At the time a frame is transferred into the instruction cache, the instruction word in that frame is predecoded by the predecoder 30 (FIG. 1), which as is explained below decodes the retrieved instruction into a full 64 bit word. As part of this predecoding the S bit of each instruction is expanded to a full 3 bit field 000, 001, . . . , 111, which provides the explicit binary group number of the instruction. In other words, the predecoder, by expanding the S bit to a three bit sequence explicitly provides information that the instruction group 000 must execute before instruction group 010, although both groups would have all instructions within the group have S bits set to 0. Because of the frame rules for sequencing groups, these group numbers correspond to the order of issue of the groups of instructions. Group 0 (000) will be issued first, Group 1 (001), if present, will be issued second, Group 2 (010) will be issued third. Ultimately, Group 7 (111), if present, will be issued last. At the time of predecoding of each instruction, the S value of the last word in the frame, which belongs to the last group in the frame to issue, is stored in the tag field for that line in the cache, along with the 19 bit real address and a valid bit. The valid bit is a bit that specifies whether the information in that line in the cache is valid. If the bit is not set to "valid," there cannot be a match or "hit" on this address. The S value from the last instruction, which S value is stored in the tag field of the line in the cache, provides a "countdown" value that can be used to know when to increment to the next cache line.

At the time a group of instructions is transferred into the instruction cache, the instruction words are predecoded by the predecoder 30. As part of the predecoding process, a multiple bit field prefix is added to each instruction based upon a tag added to the instruction by the compiler. This prefix gives the explicit pipe number of the pipeline to which that instruction will be routed. Thus, at the time an instruction is supplied from the predecoder to the instruction cache, each instruction will have a pipeline identifier.

As another part of the predecoding process, a new 4 bit field prefix is added to each instruction giving the explicit pipe number of the pipeline to which that instruction will be routed. The use of four bits, rather than three allows the system to be later expanded with additional pipelines. Thus, at the time an instruction is supplied from the predecoder to the instruction cache, each instruction will have the format shown in FIG. 6. As shown by FIG. 6, bits 0 to 56 provide 57 bits for the instruction, bits 57, 58 and 59 form the full 3 bit S field, and bits 60–63 provide the 4 bit P field.

Figure 7:
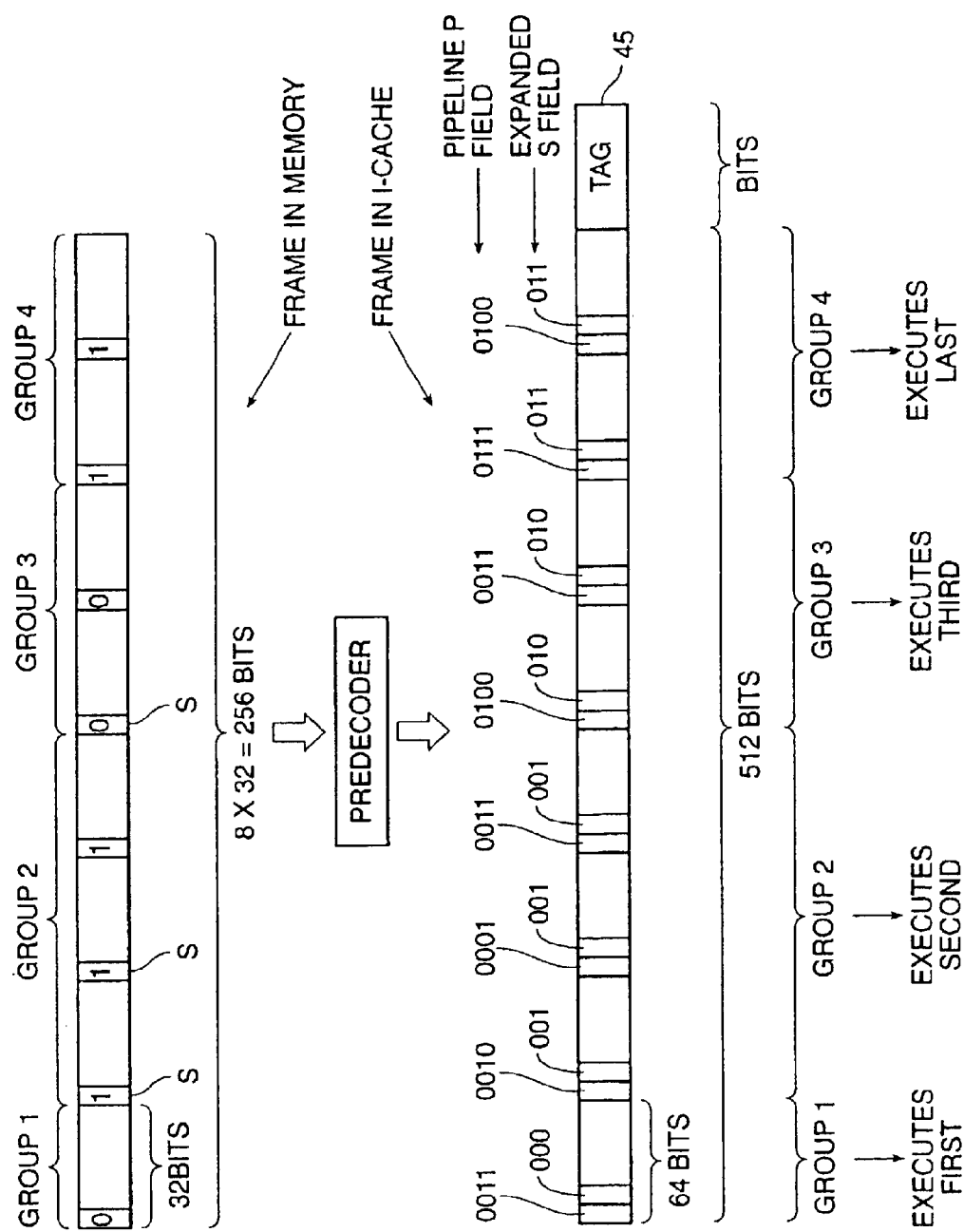
FIG. 7 illustrates the operation of the predecoder.

FIG. 7 illustrates the operation of the predecoder in transferring a frame from memory to the instruction cache. In the upper portion of FIG. 7, the frame is shown with a hypothetical four groups of instructions. The first group consists of a single instruction, the second group of three instructions, and each of the third and fourth groups of two instructions. As described, instruction is 32 bits in length and include an S bit to separate the groups. The predecoder decodes the instruction shown in the upper portion of FIG. 7 into the instruction shown in the lower portion of FIG. 7. As shown, the instructions are expanded to 64 bit length, with each instruction including a 4 bit identification of the pipeline to which the instruction is to be assigned, and the expanded group field to designate the groups of instructions that can be executed together. For illustration, hypothetical pipeline tags have been applied. Additionally, the predecoder examines each frame for the minimum number of clocks required to execute the frame, and that number is appended to the address tag 45 for the line. The address tag consists of bits provided for the real address for the line, 1 bit to designate the validity of the frame, and 3 bits to specify the minimum time in number of clock cycles, for that frame to issue. The number of clocks for the frame to issue is determined by the group identification number of the last word in the frame. At this stage, the entire frame shown in the lower portion of FIG. 7 is present in the instruction cache.

It may be desirable to implement the system of this invention on computer systems that already are in existence and therefore have instruction structures that have already been defined without available blank fields for the group information, pipeline information, or both. In this case, in another embodiment of this invention, the group and the pipeline identifier information is supplied on a different clock cycle, then combined with the instructions in the cache or placed in a separate smaller cache. Such an approach can be achieved by adding a "no-op" instruction with fields that identify which instructions are in which group, and identify the pipeline for execution of the instruction, or by supplying the information relating to the parallel instructions in another manner. It therefore should be appreciated that the manner in which the data, the instruction and pipeline identifier arrives at the crossbar to be processed is somewhat arbitrary. I use the word "associated" herein to designate the concept that the pipeline and group identifiers are not required to have a fixed relationship to the instruction words. That is, the pipeline and group identifiers need not be embedded within the instructions themselves by the compiler as shown in FIG. 7. Instead they may arrive from another means, or on a different cycle.

Figure 8:
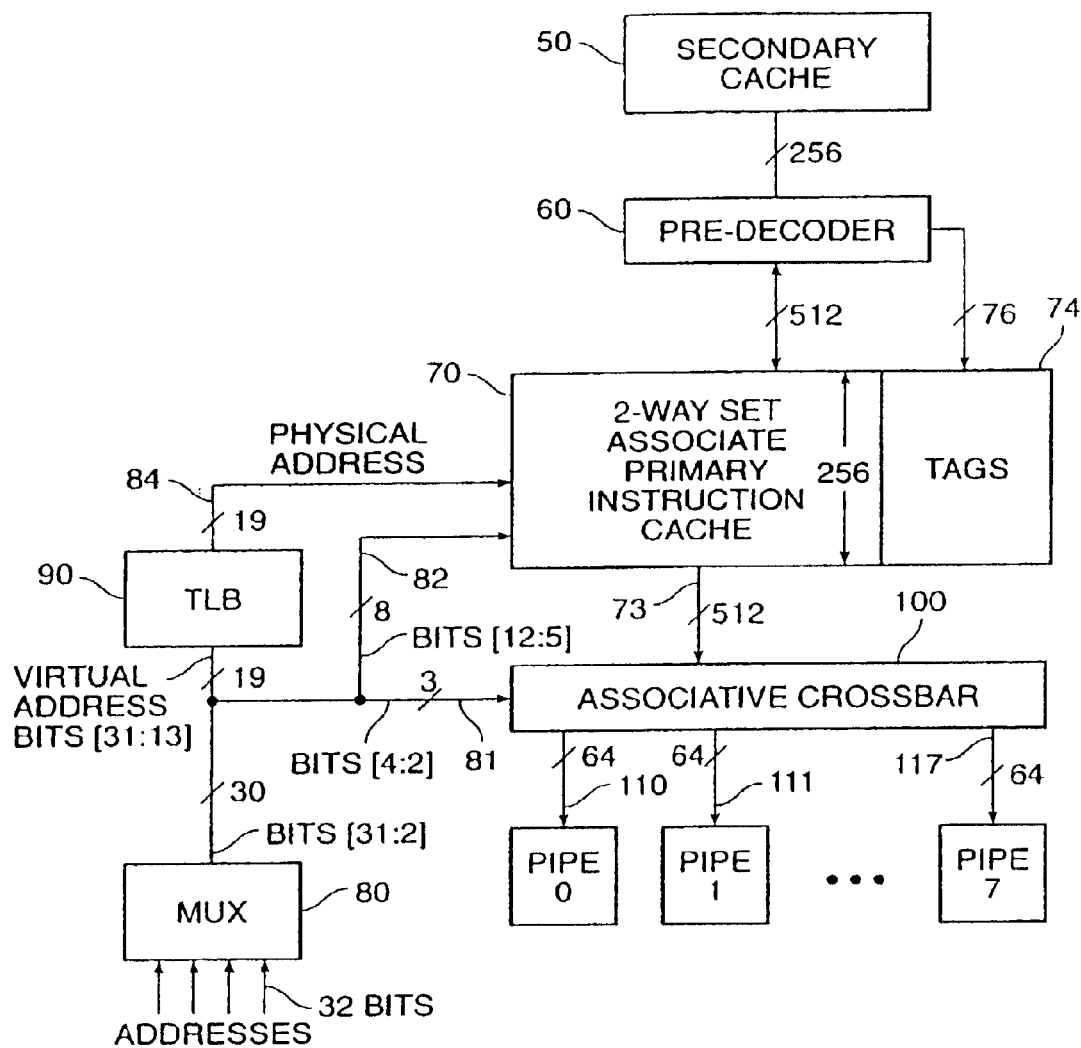
FIG. 8 is a diagram illustrating the overall structure of the instruction cache of FIG. 1.
Figure 9:
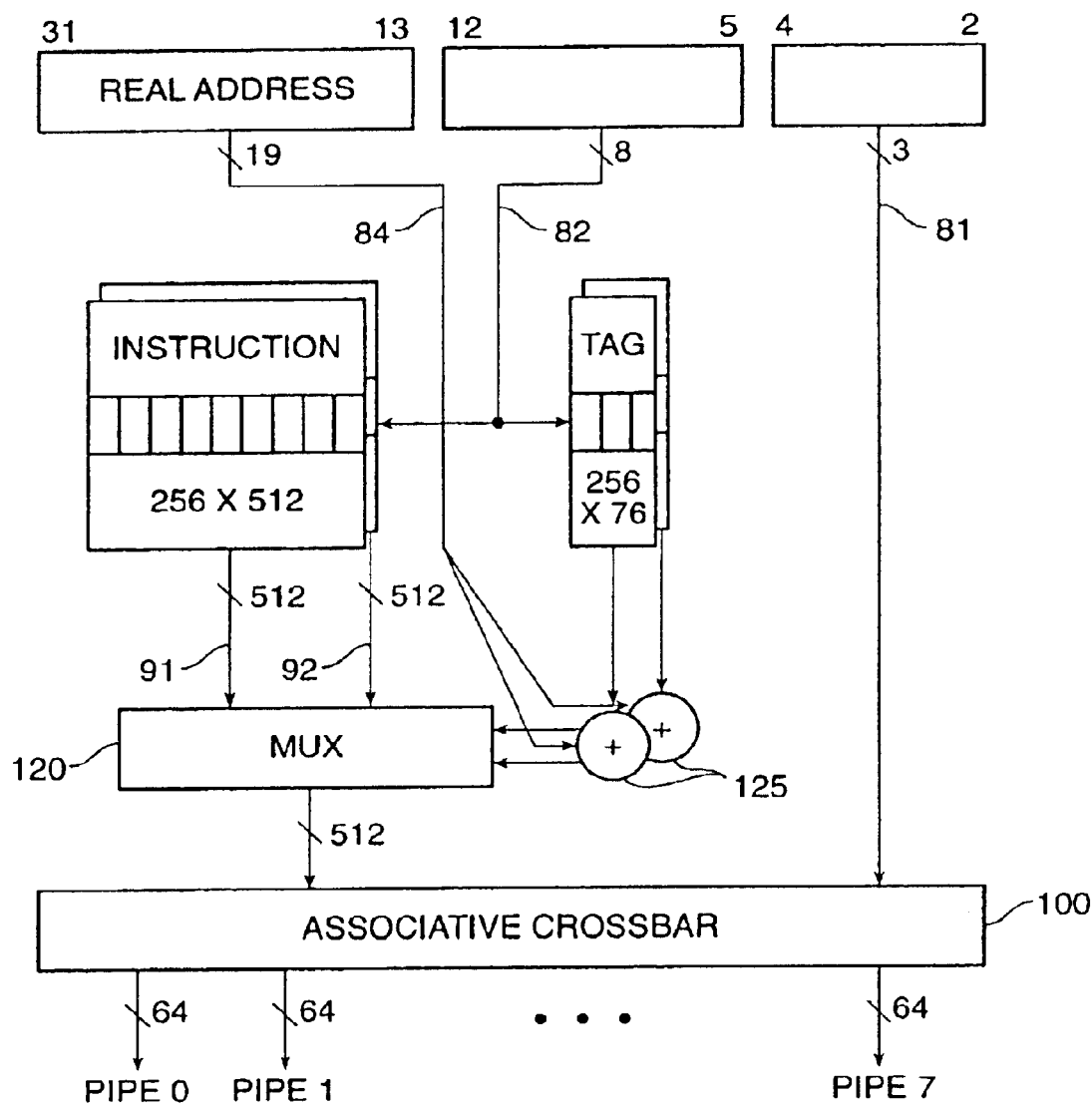
FIG. 9 is a diagram illustrating the manner in which frames are selected from the instruction cache.
Figure 10:
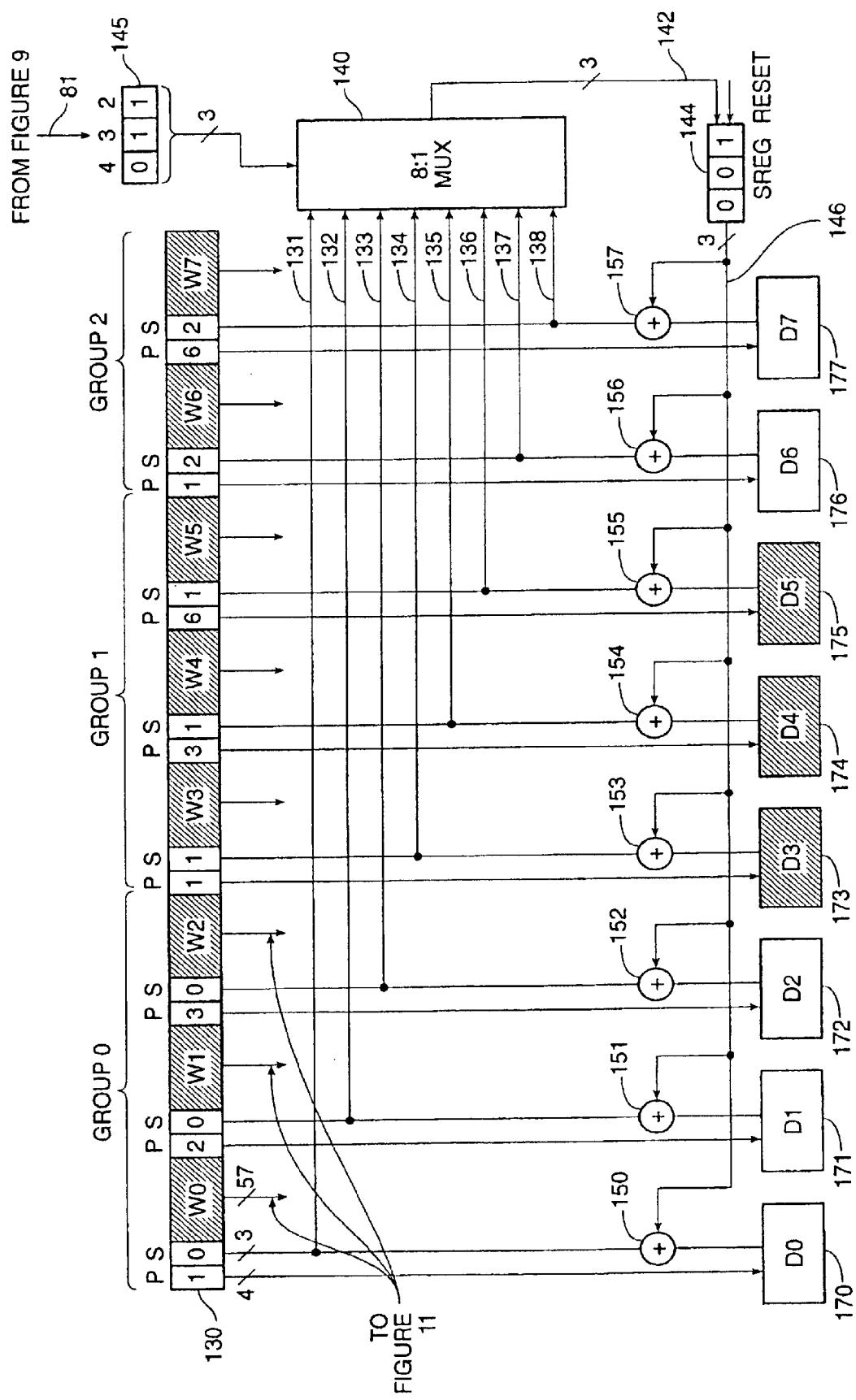
FIG. 10 is a diagram illustrating one embodiment of the associative crossbar and the group selection function in the associative crossbar.
Figure 11:
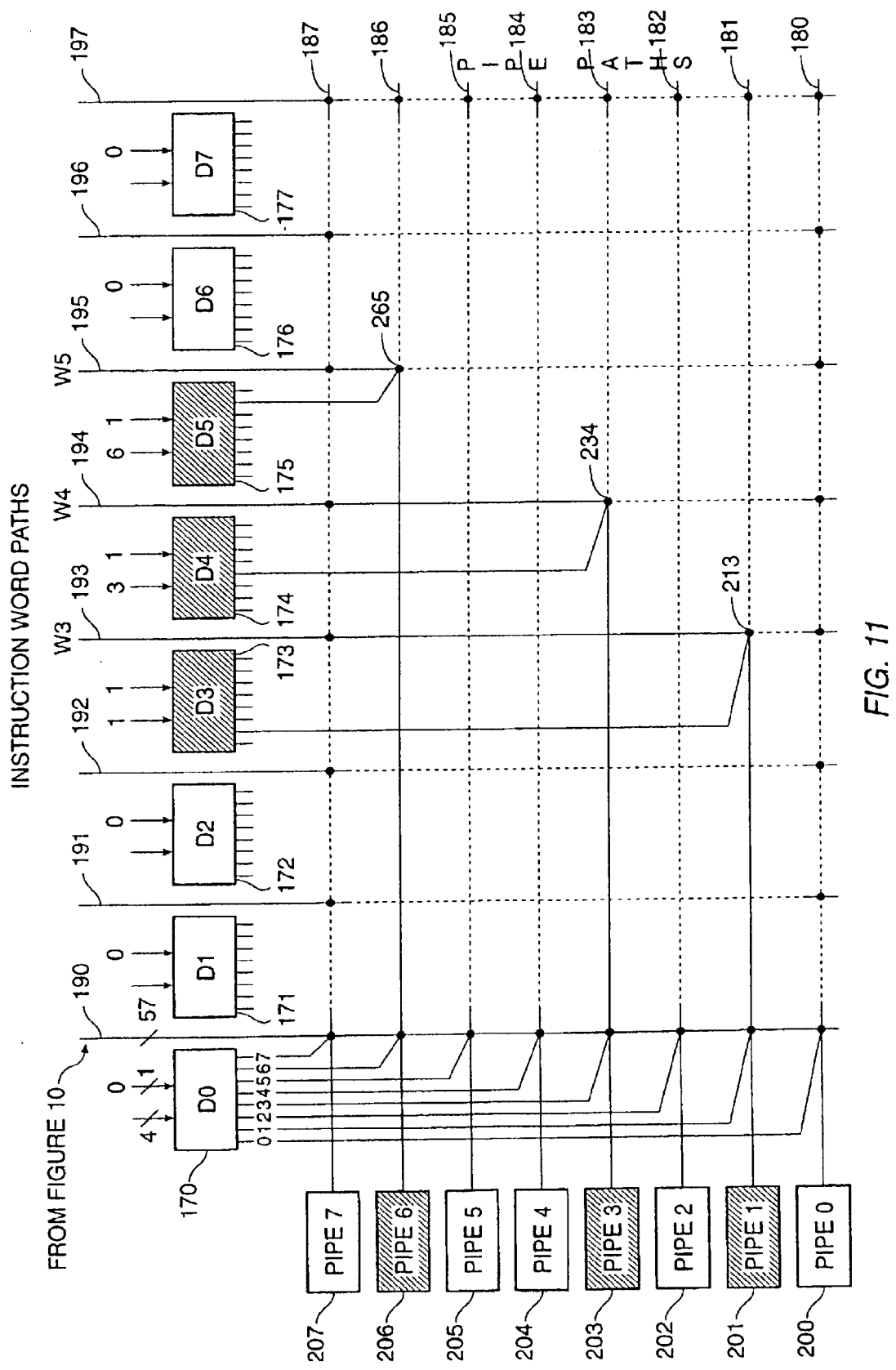
FIG. 11 is a diagram illustrating the group dispatch function in the associative crossbar.

FIG. 8 is a simplified diagram illustrating the secondary cache, the predecoder, and the instruction cache. This Figure, as well as FIGS. 9, 10 and 11, are used to explain the manner in which the instructions tagged with the P and S fields are routed to their designated instruction pipelines.

In FIG. 8, for illustration, assume that groups of instructions to be executed in parallel, instruction frames, are fetched in a single transfer across a 256 bit (32 byte) wide path from a secondary cache 50 into the predecoder 60. As explained above, the predecoder expands each 32 bit instruction in the frame to its full 64 bit wide form and prefixes the pipeline "P" and S fields to the instruction. After predecoding the resulting set of instructions, 512 bit wide instruction, is transferred into the primary instruction cache 70. At the same time, a tag is placed into the tag field 74 for that line.

In the preferred embodiment the instruction cache operates as a conventional physically-addressed instruction cache. In the example depicted in FIG. 8, the instruction cache will contain 512 bit sets of instructions, fully-expanded instruction frames of eight instructions each, organized in two compartments of 256 lines.

Address sources for the instruction cache arrive at a multiplexer 80 that selects the next address to be fetched. Because preferably instructions are always machine words, the low order two address bits <1:0> of the 32 bit address field supplied to multiplexer 80 are discarded. These two bits designate byte and half-word boundaries. Of the remaining 30 bits, the next three low order address bits <4:2>, which designate a particular instruction word in the set, a frame, are sent directly via bus 81 to the associative crossbar (explained in conjunction with subsequent figures). The next low eight address bits <12:5> are supplied over bus 82 to the instruction cache 70 where they are used to select one of the 256 lines in the instruction cache. Finally, the remaining 19 bits of the virtual address <31:13> are sent to the translation lookaside buffer (TLB) 90. The TLB translates these bits into the high 19 bits of the physical address. The TLB then supplies them over bus 84 to the instruction cache. In the cache they are compared with the tag of the selected line, to determine if there is a "hit" or a "miss" in the instruction cache.

If there is a hit in the instruction cache, indicating that the addressed instruction is present in the cache, then the selected set of instructions, frame containing the addressed instruction is transferred across the 512 bit wide bus 73 into the associative crossbar 100. The associative crossbar 100 then dispatches the addressed instruction, with the other instructions in its group, if any, to the appropriate pipelines over buses 110, 111, . . . , 117. Preferably the bit lines from the memory cells storing or containing the bits of the instruction are themselves coupled to the associative crossbar. This eliminates the need for numerous sense amplifiers, and allows the crossbar to operate on the lower voltage swing information from the cache line directly, without the normally intervening driver circuitry to slow system operation.

FIG. 9 is a block diagram illustrating in more detail the frame selection process. As shown, bits <4:2> of the virtual address are supplied directly to the associative crossbar 100 over bus 81. Bus 81, as explained above will preferably include a pair of conductors, the bit lines, for each data bit in the field. Bits <12:5> supplied over bus 82 are used to select a line in the instruction cache. The remaining 19 bits, translated into the 19 high order bits <31:13> of physical address, are used to compare against the tags of the two selected lines (one from each compartment of the cache) to determine if there is a hit in either compartment. If there is a hit, the two 512 bit wide frames are supplied to multiplexer 120. The choice of which line is ultimately supplied to associative crossbar 100 depends upon the real address bits <31:13> that are compared by comparators 125. The output from comparators 125 thus selects the appropriate frame for transfer to the crossbar 100.

FIG. 10 illustrates in more detail the group select function of the associative crossbar. A 512 bit wide register 130, preferably formed by the SRAM cells in the instruction cache contains the frame of the instructions to be issued. For the purposes of illustration, register 130 is shown as containing a frame having three groups of instructions, with Group 0 including words W0, W1 and W2; Group 1 containing words W3, W4 and W5; and Group 2 containing words W6 and W7. For illustration, the instructions in Group 0 are to be dispatched to pipelines 1, 2 and 3; the instructions in Group 1 to pipelines 1, 3 and 6; and the instructions in Group 2 to pipelines 1 and 6. The three S bits (group identification field) of each instruction in the frame are brought out to an 8:1 multiplexer 140 over buses 131, 132, 133, . . . , 138. The S field of the next group of instructions to be executed is present in a 3 bit register 145. As shown in FIG. 10, the hypothetical contents of register 145 are 011. These bits have been loaded into register 145 using bus 81 described in conjunction with FIG. 9. Multiplexer 140 then compares the value in this register against the contents of the S field in each of the instruction words. If the two values match, the appropriate decoder 150 is enabled, permitting the instruction word to be processed on that clock cycle. If the values do not match, the decoder is disabled and the instruction words are not processed on that clock cycle. In the example depicted in FIG. 10, the contents of register 145 match the S field of the Group 1 instructions. The resulting output, supplied over bus 142, is communicated to S register 144 and then to the decoders via bus 146. The S register contents enable decoders 153, 154 and 155, all of which are in Group 001. As will be shown in FIG. 11, this will enable these instructions W3, W4 and W5 to be sent to the pipelines for processing.

FIG. 11 is a block diagram illustrating the group dispatching of the instructions in the group to be executed and illustrates in more detail one embodiment of the associative crossbar. The same registers are shown across the upper portion of FIG. 11 as in the lower portion of FIG. 10. A 512 bit wide register 130, which represents the memory cells in a line of the cache (or can be a physically separate register), contains at least the set of instructions capable of being issued. For the purposes of illustration, register 130 is shown as containing up to eight instruction words W0 to W7. Using means described in the copending application referred to above, the instructions have been sorted into groups for parallel execution. For illustration here, assume the instructions in Group 1 are to be dispatched to pipelines 1, 2 and 3; the instructions in Group 2 to pipelines 1, 3 and 6; and the instructions in Group 3 to pipelines 1 and 6. The decoder select signal enables only the appropriate set of instructions to be executed in parallel, essentially allowing register 130 to contain more than just one set of instructions. Of course, by only using register 130 only for one set of parallel instructions at a time, the decoder select signal is not needed.

As shown in FIG. 10, the crossbar switch itself consists of two sets of crossing pathways. In the horizontal direction are the pipeline pathways 180, 181, . . . , 187. In the vertical direction are the instruction word paths, 190, 191, . . . , 197. Each of these pipeline and instruction pathways is themselves a bus for transferring the instruction word. Each horizontal pipeline pathway is coupled to a pipeline execution unit 200, 201, 202, . . . , 207. Each of the vertical instruction word pathways 190, 191, . . . , 197 is coupled to an appropriate portion of register or cache line 130 (FIG. 10).

The decoders 170, 171, . . . , 177 associated with each instruction word pathway receive the 4 bit pipeline code from the instruction. Each decoder, for example decoder 170, provides eight 1 bit control lines as output. One of these control lines is associated with each pipeline pathway crossing of that instruction word pathway. Selection of a decoder as described with reference to FIG. 10 activates the output bit control line corresponding to that input pipe number. This signals the crossbar to close the switch between the word path associated with that decoder and the pipe path selected by that bit line. Establishing the cross connection between these two pathways causes a selected instruction word to flow into the selected pipeline. For example, decoder 173 has received the pipeline bits for word W3. Word W3 has associated with it pipeline path 1. The pipeline path 1 bits are decoded to activate switch 213 to supply instruction word W3 to pipeline execution unit 201 over pipeline path 181. In a similar manner, the identification of pipeline path 3 for decoder D4 activates switch 234 to supply instruction word W4 to pipeline path 3. Finally, the identification of pipeline 6 for word W5 in decoder D5 activates switch 265 to transfer instruction word W5 to pipeline execution unit 206 over pipeline pathway 186. Thus, instructions W3, W4 and W5 are executed by pipes 201, 203 and 206, respectively.

The pipeline processing units 200, 201, . . . , 207 shown in FIG. 11 can carry out desired operations. In a preferred embodiment of the invention, each of the eight pipelines first includes a sense amplifier to detect the state of the signals on the bit lines from the crossbar. In one embodiment the pipelines include first and second arithmetic logic units; first and second floating point units; first and second load units; a store unit and a control unit. The particular pipeline to which a given instruction word is dispatched will depend upon hardware constraints as well as data dependencies.

Figures 12, 13:
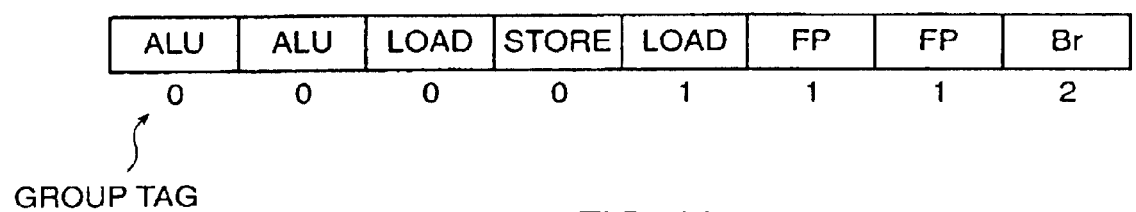
FIG. 12 is a diagram illustrating a hypothetical frame of instructions.
FIG. 13 is a diagram illustrating the manner in which the groups of instructions in FIG. 12 are issued on different clock cycles.

FIG. 12 is an example of a frame and how it will be executed by the pipeline processors 200–207 of FIG. 11. As shown in FIG. 12 the frame includes three groups of instructions. The first group, with group identification number 0, includes two instructions that can be executed by the arithmetic logic unit, a load instruction and a store instruction. Because all these instructions have been assigned the same group identification number by the compiler, all four instructions can execute in parallel. The second group of instructions consists of a single load instruction and two floating point instructions. Again, because each of these instructions has been assigned "Group 1," all three instructions can be executed in parallel. Finally, the last instruction word in the frame is a branch instruction that, based upon the compiler's decision, must be executed last.

FIG. 13 illustrates the execution of the instructions in the frame shown in FIG. 12. As shown, during the first clock the Group 0 instructions execute, during the second clock the load and floating point instructions execute, and during the third clock the branch instruction executes. To prevent groups from being split across two instruction frames, an instruction frame may be only partially filled, where the last group is too large to fit entirely within the remaining space of the frame.

Figure 14:
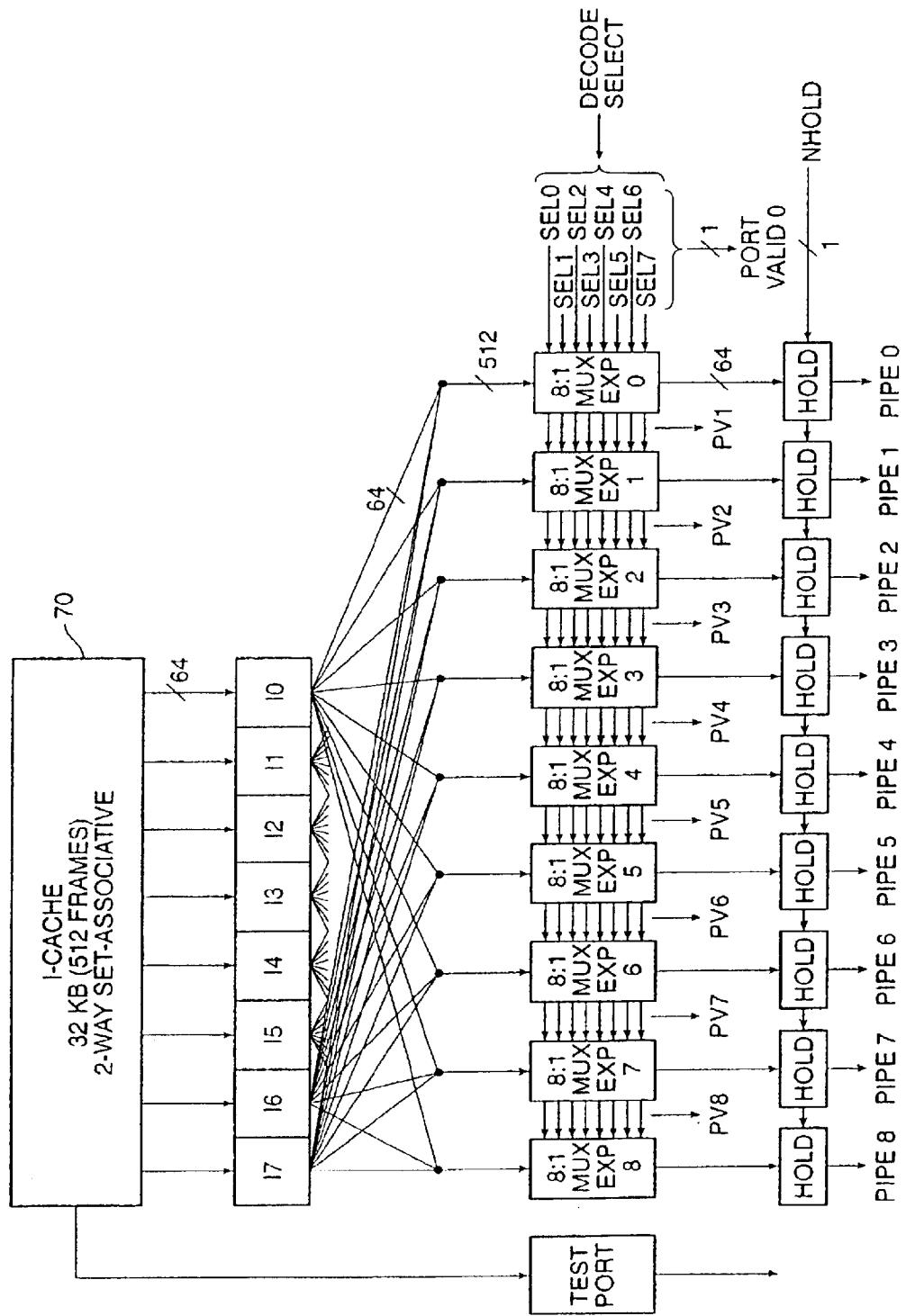
FIG. 14 is a diagram illustrating another embodiment of the associative crossbar.

FIG. 14 is a diagram illustrating another embodiment of the associative crossbar. In FIG. 14 nine pipelines 0–8 are shown coupled to the crossbar. The three bit program counter PC points to one of the instructions in the frame, in combination with the set of 8 group identification bits for the frame, indicating the group affiliation of each instruction, are used to enable a subset of the instructions in the frame. The decode select is used to enable a subset of the instructions in the register 130 for execution just as in the system of FIG. 11. The enabled instructions are those at or above the address indicated by the PC that belong to the current group.

The execution ports that connect to the pipelines specified by the pipeline identification bits of the enabled instructions are then selected to multiplex out the appropriate instructions from the current frame contents of the register. If one or more of the pipelines is not ready to receive a new instruction, a set of hold latches at the output of the execution ports prevents any of the enabled instructions from issuing until the "busy" pipeline is free. Otherwise the instructions pass transparently through the hold latches into their respective pipelines. Accompanying the output of each port is a "port valid" signal that indicates whether the port has valid information to issue to the hold latch.

Figure 15:
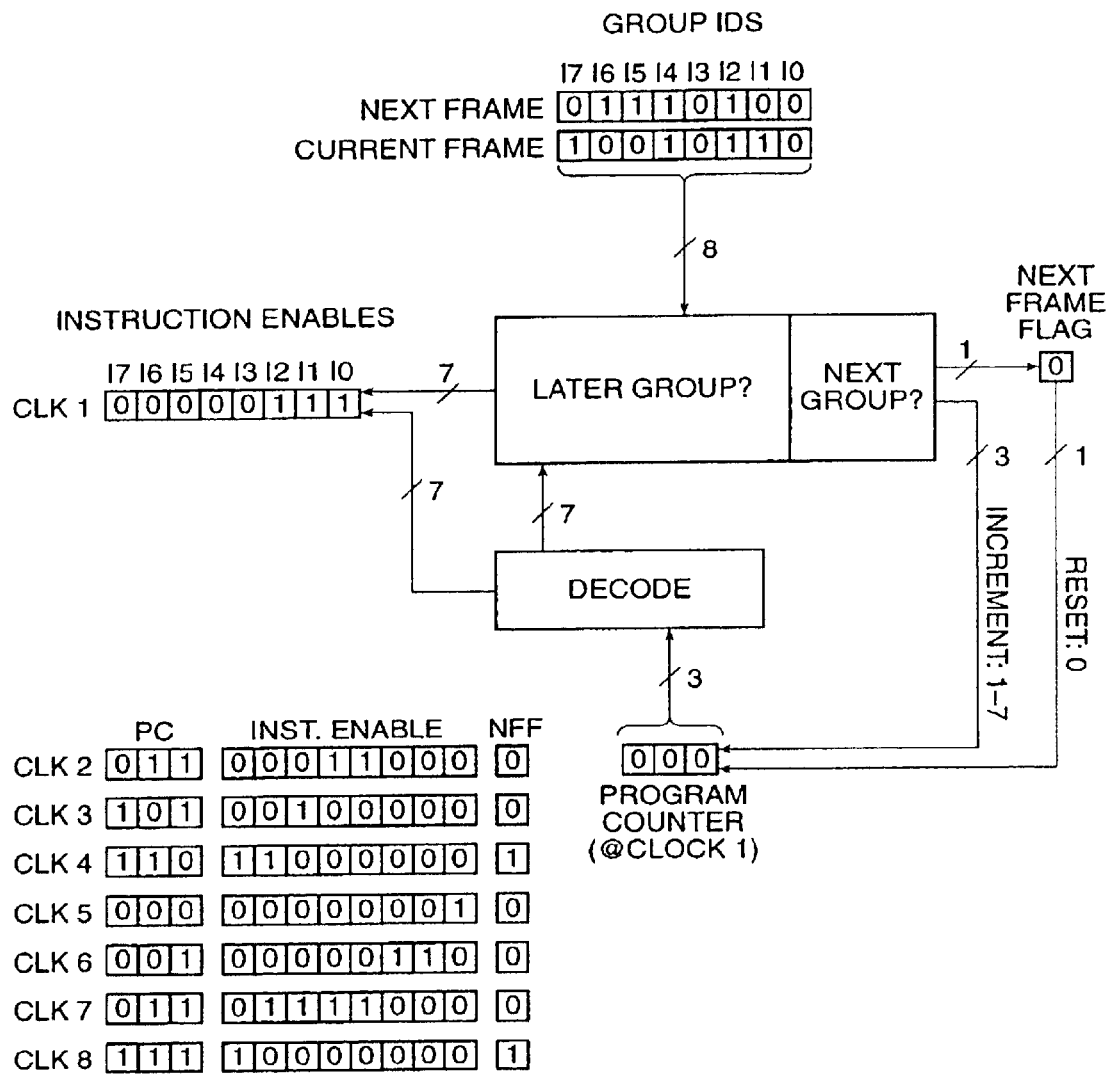
FIG. 15 is a diagram illustrating the group select function in further detail.

FIG. 15 is a diagram illustrating the group select function in further detail. This figure illustrates the mechanism used to enable an addressed group of instructions within a frame. The program counter is first decoded into a set of 14 bit signals. Seven of these signals are combined with the eight group identifiers of the current frame to determine whether each of the seven instructions, 11 to 17, is or is not the start of a later group. This information can then be combined with the other 7 bit signals from the PC decoder to determine which of the eight instructions in the frame should be enabled. Using the pipeline identifying field each enabled instruction can be combined with the other 7 bit signal to determine which of the eight instructions in the frame should be enabled. Each such enabled instruction can then signal the execution port, as determined by the pipeline identifier, to multiplex out the enabled instruction. Thus if I2 is enabled, and the pipeline code is 5, the select line from I2 to port 5 is activated, causing I2 to flow to the hold latch at pipe 5.

Because the instructions that start later groups are known, the system can decide easily which instruction starts the next group. This information is used to update the PC to the address of the next group of instructions. If no instruction in the frame begins the next group, i.e., the last instruction group has been dispatched to the pipelines, a flag is set. The flag causes the next frame of instructions to be brought into the crossbar. The PC is then reset to I0. Shown in the figure is an exemplary sequence of the values that the PC, the instruction enable bits and the next frame flag take on over a sequence of eight clocks extending over two frames.

Figure 16:
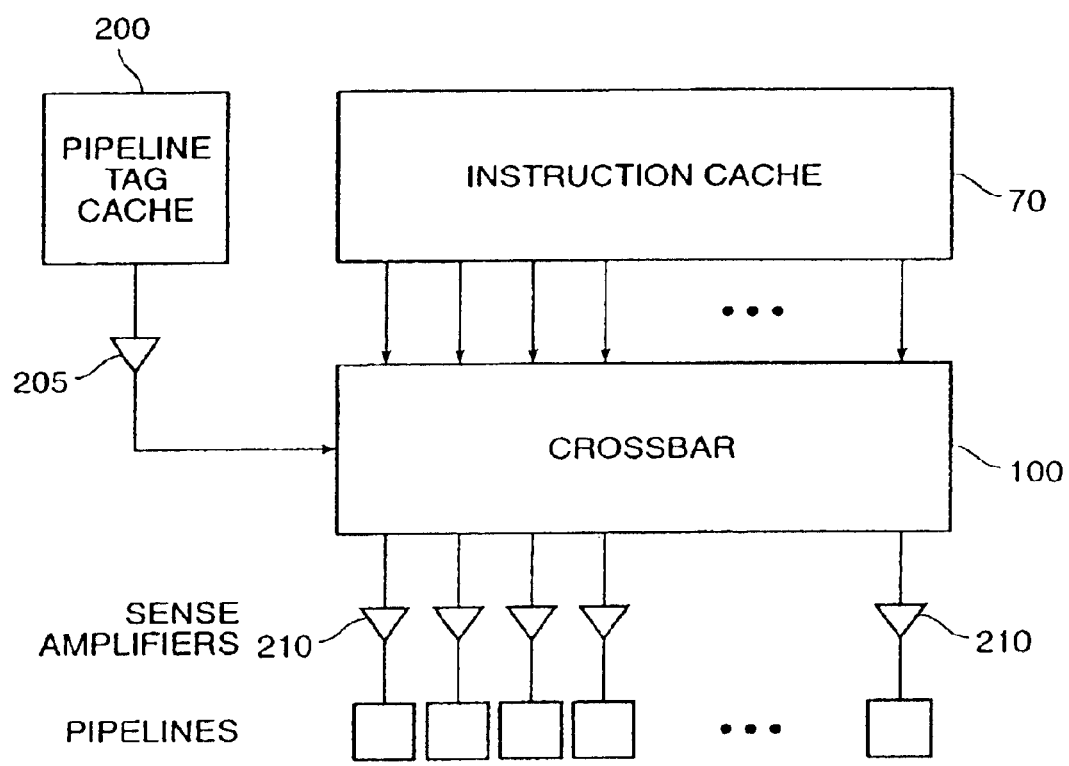
FIG. 16 is a diagram illustrating another embodiment of the associative crossbar.

FIG. 16 illustrates an alternate embodiment for the invention where pipeline tags are not included with the instruction, but are supplied separately, or where the cache line itself is used as the register for the crossbar. In these situations, the pipeline tags may be placed into a high speed separate cache memory 200. The output from this memory can then control the crossbar in the same manner as described in conjunction with FIG. 10. This approach eliminates the need for sense amplifiers between the instruction cache and the crossbar. This enables the crossbar to switch very low voltage signals more quickly than higher level signals, and the need for hundreds of sense amplifiers is eliminated. To provide a higher level signal for control of the crossbar, sense amplifier 205 is placed between the pipeline tag cache 200 and the crossbar 100. Because the pipeline tag cache is a relatively small memory, however, it can operate more quickly than the instruction cache memory, and the tags therefore are available in time to control the crossbar despite the sense amplifier between the cache 200 and the crossbar 100. Once the switching occurs in the crossbar, then the signals are amplified by sense amplifiers 210 before being supplied to the various pipelines for execution.

The processor architecture described above provides many unique advantages to a system using this crossbar. The system and the crossbar described is extremely flexible, enabling instructions to be executed sequentially or in parallel, depending entirely upon the "intelligence" of the compiler. As compiler technology improves, the described hardware can execute programs more rapidly, not being limited to any particular frame width, number of instructions capable of parallel execution, or other external constraints. Importantly, the associative crossbar relies upon the content of the message being decoded, not upon an external control circuit acting independently of the instructions being executed. In essence, the associative crossbar is self directed. In the preferred embodiment the system is capable of a parallel issue of up to eight operations per cycle.

Another important advantage of this system is that it allows for more intelligent compilers. Two instructions which appear to a hardware decoder (such as in the prior art described above) to be dependent upon each other can be determined by the compiler not to be interdependent. For example, a hardware decoder would not permit two instructions R1+R2 R3 and R3+R5=R6 to be executed in parallel. A compiler, however, can be "intelligent" enough to determine that the second R3 is a previous value of R3, not the one calculated by R1+R2, and therefore allow both instructions to issue at the same time. This allows the software to be more flexible and faster.

Although the foregoing has been a description of the preferred embodiment of the invention, it will be apparent to those of skill in the art the numerous modifications and variations may be made to the invention without departing from the scope as described herein. For example, arbitrary numbers of pipelines, arbitrary numbers of decoders, and different architectures may be employed, yet rely upon the system we have developed.

What is claimed is:

1. A method for operating a computing system comprises:
fetching a first 256 bit-wide frame of instructions from an instruction memory, the first frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of groups of instructions from the first frame of instructions, wherein the groups of instructions comprise at least one group of instructions and comprise at most eight groups of individual instructions, wherein a group of instructions are issued separately from other groups of instructions within the first frame of instructions, wherein groups of instructions are issued from left-to-right from the first frame of instructions, and wherein instructions within a group of instructions are issued in parallel;

issuing instructions in a first group of instructions from the first frame of instructions to functional units appropriate for the instructions in the first group of instructions in response to grouping bits of the instructions in the first group of instructions and in response to a mapping of the instructions in the first group of instructions to functional units, wherein the mapping is determined in response to at least a portion of instruction data in each instruction in the first group of instructions from the first frame of instructions;

fetching a second 256 bit-wide frame of instructions from the instruction memory, the second frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of groups of instructions from the second frame of instructions, wherein the groups of instructions comprise at least one group of instructions and comprise at most eight groups of individual instructions, wherein a group of instructions are issued separately from other groups of instructions within the second frame of instructions, wherein groups of instructions are issued from left-to-right from the second frame of instructions, and wherein instructions within a group of instructions are issued in parallel; and issuing instructions in a first group of instructions from the second frame of instructions to functional units appropriate for the instructions in the first group of instructions in response to grouping bits of the instructions in the first group of instructions and in response to a mapping of the instructions in the first group of instructions to functional units, wherein the mapping is determined in response to at least a portion of instruction data in each instruction in the first group of instructions from the second frame of instructions;

wherein instructions from the first 256 bit-wide frame of instructions are issued before fetching the second 256 bit-wide frame of instructions from the instruction memory; and wherein the grouping bits of the 32 bit-wide instructions from the first frame of instructions and the grouping bits of the 32 bit-wide instructions from the second frame of instructions are specifiable at compile time.

2. The method of claim 1 wherein the first 256 bit-wide frame of instructions comprises less then eight 32 bit-wide instructions.

3. The method of claim 1 further comprising:

issuing instructions in a second group of instructions from the first frame of instructions to functional units appropriate for the instructions in the second group of instructions in response to grouping bits of the instructions in the second group of instructions and in response to a mapping of the instructions in the second group of instructions to functional units, wherein the mapping is determined in response to a portion of instruction data in each instruction in the second group of instructions from the first frame of instructions.

4. The method of claim 3 wherein a functional unit appropriate for an instruction in the second group of instructions from the first frame of instruction comprises a floating point unit.

5. The method of claim 4 wherein the second group of instructions from the first frame of instructions includes a floating point instruction.

6. The method of claim 1 wherein the first 256 bit-wide frame of instructions comprises exactly eight 32 bit-wide instructions.

7. The method of claim 6 further comprising:

issuing instructions in a second group of instructions from the second frame of instructions to functional units appropriate for the instructions in the second group of instructions in response to grouping bits of the instructions in the second group of instructions and in response to a mapping of the instructions in the second group of instructions to functional units, wherein the mapping is determined in response to at least a portion of instruction data in each instruction in the second group of instructions from the second frame of instructions.

8. The method of claim 1 wherein three groups of instructions are packed within the first 256 bit-wide frame of instructions thereby reducing instruction code size.

9. The method of claim 8 wherein issuing instructions in a first group of instructions from the first frame of instructions further comprises decoding the instructions in the first group of instructions before issuance to functional units appropriate for the instructions in the first group of instructions from the first frame of instructions.

10. The method of claim 1 wherein four groups of instructions are packed within the first 256 bit-wide frame of instructions thereby reducing a number of no-operations within the first 256 bit-wide frame of instructions.

11. The method of claim 10 wherein groups of instructions are not split across the first 256 bit-wide frame of instructions and the second 256 bit-wide frame of instructions.

12. The method of claim 10 wherein the grouping bits of the 32 bit-wide instructions from the first frame of instructions and the grouping bits of the 32 bit-wide instructions from the second frame of instructions are specified at compile time in response to data dependency checking of the instructions in the first frame of instructions and in response to data dependency checking of the instructions in the second frame of instructions.

13. The method of claim 1 wherein the instructions in the first instruction frame are stored in little-endian format.

14. The method of claim 13 wherein the functional units appropriate for the instructions in the first group of instructions in the first frame of instructions are selected from a group of eight functional units.

15. The method of claim 1 wherein the groups of instructions from the first frame of instructions comprise the first group of instructions, a second group of instructions, and a third group of instructions;

wherein instructions grouped as the second group of instructions are to be issued in parallel to appropriate functional units before instructions grouped as the third group of instructions are to be issued in parallel.

16. The method of claim 15
wherein the first group of instructions comprises two instructions to be issued in parallel;
wherein the second group of instructions comprises three instructions to be issued in parallel; and
wherein the third group of instructions comprises three instructions to be issued in parallel.

17. The method of claim 15
wherein the groups of instructions from the first frame of instructions also comprise a fourth group of instructions;
wherein instructions grouped as the third group of instructions are to be issued in parallel to appropriate functional units before instructions grouped as the fourth group of instructions are to be issued in parallel;
wherein the third group of instructions comprises two instructions to be issued in parallel; and
wherein the fourth group of instructions comprises two instructions to be issued in parallel.

18. The method of claim 1 wherein the first group of instructions from the first frame of instructions includes two add instructions that are issued in parallel to functional units appropriate for the two add instructions.

19. The method of claim 18 wherein the functional units include two arithmetic logic units.

20. The method of claim 18 wherein the first group of instructions from the first frame of instructions also includes a load instruction.

21. The method of claim 1 wherein an instruction in the first group of instructions from the first frame of instructions operates upon registers.

22. The method of claim 21 wherein an instructions from the first frame of instructions comprises a branch instruction.

23. A processor comprises:
a plurality of functional units;
an instruction memory configured to store a first 256-bit wide frame of instructions, the first frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of variable length groups of instructions from the first frame of instructions, wherein the variable length groups of instructions comprise at least one group of instructions and comprise at most eight groups of individual instructions, wherein a group of instructions are dispatched separately from other groups of instructions within the first frame of instructions, wherein groups of instructions are dispatched from left-to-right from the first frame of instructions, and wherein instructions within a group of instructions are dispatched in parallel; and
an instruction dispatching unit coupled to the instruction memory and the plurality of functional units, the instruction dispatching unit configured to dispatch instructions in a first group of instructions from the first frame of instructions to functional units appropriate for the instructions in the first group of instructions in response to grouping bits of the instructions in the first group of instructions and in response to a mapping of the instructions in the first group of instructions to functional units, wherein the mapping is determined in response to at least a portion of instruction data in each instruction in the first group of instructions from the first frame of instructions; and
wherein the grouping bits of the 32 bit-wide instructions from the first frame of instructions are determinable at compile time.

24. The processor of claim 23
wherein the instruction memory is also configured to store a second 256 bit-wide frame of instructions, the second frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of variable length groups of instructions from the second frame of instructions, wherein the variable length groups of instructions comprise at least one group of instructions and comprise at most eight groups of individual instructions, wherein a group of instructions are dispatched separately from other groups of instructions within the second frame of instructions, wherein groups of instructions are dispatched from left-to-right from the second frame of instructions, and wherein instructions within a group of instructions are dispatched in parallel;
wherein the instruction dispatching unit is also configured to dispatch instructions in a first group of instructions from the second frame of instructions to functional units appropriate for the instructions in the first group of instructions in response to grouping bits of the instructions in the first group of instructions and in response to a mapping of the instructions in the first group of instructions to functional units, wherein the mapping is determined in response to at least a portion of instruction data in each instruction in the first group of instructions from the second frame of instructions; and
wherein the first group of instructions from the first 256-bit wide frame of instructions are dispatched before the first group of instruction in the second 256 bit-wide frame of instructions.

25. The processor of claim 24 wherein the instruction dispatching unit is also configured to dispatch instructions in a second group of instructions from the first frame of instructions to functional units appropriate for the instructions in the second group of instructions in response to grouping bits of the instructions in the second group of instructions and in response to a mapping of the instructions in the second group of instructions to functional units, wherein the mapping is determined in response to at least a portion of instruction data in each instruction in the second group of instructions from the first frame of instructions.

26. The processor of claim 25 wherein the first 256 bit-wide frame of instructions comprises less than eight 32 bit-wide instructions and a no operation.

27. The processor of claim 23 wherein the plurality of functional units comprises a functional unit configured to perform floating-point operations.

28. The processor of claim 27 wherein an instruction in the first frame of instructions comprises a floating point instruction.

29. The processor of claim 23 wherein the plurality of functional units also comprises a functional unit configured to perform a load operation and a store operation.

30. The processor of claim 29 wherein the plurality of functional units also comprises a functional unit configured to perform branch instructions.

31. The processor of claim 30 wherein the first 256 bit-wide frame of instructions comprises exactly eight 32 bit-wide instructions.

32. The processor of claim 23 wherein at least three groups of instructions are packed within the first 256 bit-wide frame of instructions thereby saving memory space.

33. The processor of claim 32 wherein the instruction dispatching unit is also configured to fetch the first frame of instructions and configured to decode the instructions in the first group of instructions before dispatch to functional units appropriate for the instructions in the first group of instructions from the first frame of instructions.

34. The processor of claim 23 wherein groups of instructions to be dispatched in parallel are not split across frames of instructions.

35. The processor of claim 34 wherein four groups of instructions are packed within the first 256 bit-wide frame of instructions thereby reducing memory bandwidth.

36. The processor of claim 34 wherein the grouping bits of the 32 bit-wide instructions from the first frame of instructions are determined at compile time in response to data dependency checking of the instructions in the first frame of instructions.

37. The processor of claim 23 wherein the functional units appropriate for the instructions in the first group of instructions in the first frame of instructions are selected from a group of eight functional units.

38. The processor of claim 37 wherein the instructions in the first instruction frame are stored in little-endian format.

39. The processor of claim 23
wherein the groups of instructions from the first frame of instructions comprise the first group of instructions, a second group of instructions, and a third group of instructions;
wherein the instruction dispatching unit is also configured to dispatch instructions in a second group of instructions from the first frame of instructions to functional units appropriate for the instructions in the second group of instructions in response to grouping bits of the instructions in the second group of instructions and in response to a mapping of the instructions in the second group of instructions to functional units, wherein the mapping is determined in response to at least a portion of instruction data in each instruction in the second group of instructions from the first frame of instructions; and
wherein the instruction dispatching unit is also configured to dispatch instructions grouped as the first group of instructions in parallel to appropriate functional units before dispatching instructions grouped as the second group of instructions in parallel.

40. The processor of claim 39
wherein the first group of instructions comprises two instructions to be dispatched in parallel;
wherein the second group of instructions comprises three instructions to be dispatched in parallel; and
wherein the third group of instructions comprises three instructions to be dispatched in parallel.

41. The processor of claim 39
wherein the groups of instructions from the first frame of instructions also comprise a fourth group of instructions;
wherein the instruction dispatching unit is also configured to dispatch instructions in a third group of instructions from the first frame of instructions to functional units appropriate for the instructions in the third group of instructions in response to grouping bits of the instructions in the third group of instructions and in response to a mapping of the instructions in the third group of instructions to functional units, wherein the mapping is determined in response to at least a portion of instruction data in each instruction in the third group of instructions from the first frame of instructions;
wherein the instruction dispatching unit is also configured to dispatch instructions grouped as the second group of instructions in parallel to appropriate functional units before dispatching instructions grouped as the third group of instructions in parallel;
wherein the third group of instructions comprises two instructions to be dispatched in parallel; and
wherein the fourth group of instructions comprises two instructions to be dispatched in parallel.

42. The processor of claim 23 wherein the plurality of functional units include functional units configured to perform arithmetic and logic operations.

43. The processor of claim 42 wherein an instruction of the first group of instructions from the first frame of instructions comprises a load instruction.

44. The processor of claim 42 wherein the instructions of the first group from the first frame of instructions comprises two addition instructions.

45. The processor of claim 42 wherein at least one instruction in the first group of instructions from the first frame of instructions operates upon registers.

46. The processor of claim 42 wherein an instruction from the first frame of instructions comprises a branch instruction.

47. An apparatus comprises:
a memory configured to store a plurality of instruction data; and
a processor coupled to the memory comprising:
a memory controller configured to receive a first set of instruction data from the memory;
a plurality of functional units;
an instruction memory configured to store a first 256-bit wide frame of instructions in response to the first set of instruction data from the memory, the first frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of groups of instructions of variable lengths from the first frame of instructions, wherein the groups of instructions comprise at least one group of instructions and comprise at most eight groups of instructions, wherein a number of instructions in the groups of instructions comprises at least one instruction and up to eight instructions, wherein a group of instructions are dispatched separately from other groups of instructions within the first frame of instructions, wherein groups of instructions are dispatched from left-to-right from the first frame of instructions, and wherein instructions within a group of instructions are dispatched in parallel; and
an instruction dispatching unit coupled to the instruction memory and coupled to the plurality of functional units, the instruction dispatching unit configured to fetch the first frame of instructions from the instruction memory and configured to dispatch instructions in a first group of instructions from the first frame of instructions to functional units appropriate for the instructions in the first group of instructions in response to grouping bits of the instructions in the first group of instructions and in response to a mapping of the instructions in the first group of instructions to appropriate functional units, wherein the mapping is determined in response to at least a portion of instruction data in each instruction in the first group of instructions from the first frame of instructions;

wherein the grouping bits of the instructions in the first group of instructions from the first frame of instructions are determinable at compile time.

48. The apparatus of claim 47 wherein the memory controller is configured to receive a second set of instruction data from the memory;

wherein the instruction memory is also configured to store a second 256-bit wide frame of instructions in response to the second set of instruction data from the memory, the second frame of instructions comprising up to eight 32 bit-wide instructions, each 32-bit wide instruction comprising 31 contiguous bits of instruction data and a one bit wide grouping bit, wherein grouping bits of the 32 bit-wide instructions are indicative of groups of instructions of variable lengths from the second frame of instructions, wherein the groups of instructions comprise at least one group of instructions and comprise at most eight groups of instructions, wherein a number of instructions in the groups of instructions comprises at least one instruction and up to eight instructions, wherein a group of instructions are dispatched separately from other groups of instructions within the second frame of instructions, wherein groups of instructions are dispatched from left-to-right from the first frame of instructions, and wherein instructions within a group of instructions are dispatched in parallel; and wherein the instruction dispatching unit is also configured to fetch the second frame of instructions from the instruction memory and configured to dispatch instructions in a first group of instructions from the second frame of instructions to functional units appropriate for the instructions in the first group of instructions in response to grouping bits of the instructions in the first group of instructions and in response to a mapping of the instructions in the first group of instructions to appropriate functional units, wherein the mapping is determined in response to at least a portion of instruction data in each instruction in the first group of instructions from the second frame of instructions;

wherein the grouping bits of the instructions in the first group of instructions from the first 256-bit wide frame of instructions and the grouping bits of the instructions in the first group of instructions from the second 256 bit-wide frame of instructions are determined at compile time.

49. The apparatus of claim 48 wherein the instruction dispatching unit is also configured to dispatch instructions in a second group of instructions from the first frame of instructions to functional units appropriate for the instructions in the second group of instructions in response to grouping bits of the instructions in the second group of instructions and in response to a mapping of the instructions in the second group of instructions to appropriate functional units, wherein the mapping is determined in response to at least a portion of instruction data in each instruction in the second group of instructions from the first frame of instructions.

50. The apparatus of claim 48 wherein the first 256 bit-wide frame of instructions comprises a no operation.

51. The apparatus of claim 47 wherein the plurality of functional units comprise eight functional units including a floating-point unit.

52. The apparatus of claim 51 wherein an instruction in a group of instructions from the first frame of instructions comprises a floating point instruction.

53. The apparatus of claim 52 wherein the plurality of functional units also includes a functional unit configured to perform a load operation.

54. The apparatus of claim 51 wherein the plurality of functional units also includes a branch unit.

55. The apparatus of claim 54 wherein the first 256 bit-wide frame of instructions comprises exactly eight 32 bit-wide instructions.

56. The apparatus of claim 47 wherein more than two groups of instructions are packed within the first 256 bit-wide frame of instructions thereby reducing instruction code size.

57. The apparatus of claim 56 wherein the instruction dispatching unit is also configured to decode the instructions in the first group of instructions before dispatch to the appropriate functional units.

58. The apparatus of claim 57 wherein groups of instructions to be dispatched in parallel are not split across frames of instructions.

59. The apparatus of claim 56 wherein the grouping bits of the instructions in the first group of instructions from the first frame of instructions are specified at compile time in response to data dependency checking of the instructions in the first group of instructions from the first frame of instructions.

60. The apparatus of claim 56 wherein the instructions in the first instruction frame are stored in little-endian format.

61. The apparatus of claim 47 wherein the groups of instructions from the first frame of instructions comprise the first group of instructions, a second group of instructions, and a third group of instructions; and wherein a number of instructions in the first group of instructions is different from a number of instructions in the second group of instructions.

62. The apparatus of claim 61 wherein the groups of instructions from the first frame of instructions also comprise a fourth group of instructions; and wherein a number of instructions in the first group of instructions is different from a number of instructions in the fourth group of instructions.

63. The apparatus of claim 61 wherein the plurality of functional units includes at least one arithmetic logic unit.

64. The apparatus of claim 42 wherein the plurality of functional units includes at least two arithmetic logic units; and wherein the first group of instructions from the first frame of instructions comprises two addition instructions.

65. The apparatus of claim 64 wherein the first group of instructions from the first frame of instructions also comprise a load instruction.

66. The apparatus of claim 65 wherein the two addition instructions operate upon registers.

67. The apparatus of claim 47 wherein a number of instructions in the first group of instructions is equal to a number of instructions in the second group of instructions.

68. The apparatus of claim 67 wherein the number of instructions in the first group of instructions is exactly one instruction.

69. The apparatus of claim 47 wherein the right-most instruction in the first frame of instructions is configured to store a branch operation.

70. An instruction memory comprises:

a first 256-bit wide frame of instructions comprising eight 32 bit-wide instructions, each 32-bit wide instruction comprising 31 contiguous bits of instruction data and a one bit wide grouping bit, wherein grouping bits of the 32 bit-wide instructions are indicative of groups of variable numbers of instructions from the first frame of instructions, wherein the first frame of instructions comprise at least one group of instructions and comprise at most eight groups of instructions, wherein a number of instructions in the groups of instructions comprises at least one instruction and up to eight instructions, wherein a group of instructions are dispatched serially from left-to-right within the first frame of instructions, and wherein instructions within a group of instructions are dispatched in parallel; and a second 256 bit wide frame of instructions comprising eight 32 bit-wide instructions, each 32-bit wide instruction comprising 31 contiguous bits of instruction data and a one bit wide grouping bit, wherein grouping bits of the 32 bit-wide instructions are indicative of groups of variable numbers of instructions from the second frame of instructions, wherein the second frame of instructions comprise at least one group of instructions and comprise at most eight groups of instructions, wherein a number of instructions in the groups of instructions comprises at least one instruction and up to eight instructions, wherein a group of instructions are dispatched serially from left-to-right within the second frame of instructions, and wherein instructions within a group of instructions are dispatched in parallel;

wherein a first group of instructions from the first frame of instructions are dispatched to functional units appropriate for instructions in the first group in response to grouping bits of the instructions in the first group of instructions;

wherein a second group of instructions from the first frame of instructions are dispatched to functional units appropriate for instructions in the second group in response to grouping bits of the instructions in the second group of instructions;

wherein a first group of instructions from the second frame of instructions are dispatched to functional units appropriate for instructions in the first group in response to grouping bits of the instructions in the first group of instructions from the second frame of instructions; and wherein the grouping bits of the instructions in the first frame of instructions and the grouping bits of the instructions in the second frame of instructions are determined at a time other than run-time.

71. The instruction memory of claim 70 wherein the first group of instructions from the second frame of instructions are dispatched only after all instructions in the first frame of instructions are dispatched.

72. The instruction memory of claim 71 wherein the grouping bits of the instructions from the first frame of instructions and the first group grouping bits of the instructions from the second frame of instructions are determined at compile time.

73. The instruction memory of claim 72 wherein the first group of instructions from the first frame of instructions are dispatched in response to a mapping of the instructions in the first group of instructions to appropriate functional units; and wherein the mapping of the instructions is determined in response to at least a portion of instruction data in each instruction in the first group of instructions from the first frame of instructions.

74. The instruction memory of claim 72 wherein an instruction in the first frame of instructions comprises a no-op instruction.

75. The instruction memory of claim 70 wherein functional units appropriate for instructions in the first group of instructions in the first frame of instructions comprise eight functional units.

76. The instruction memory of claim 75 wherein a functional unit appropriate for an instruction in the first frame of instructions comprises a floating point unit.

77. The instruction memory of claim 76 wherein an instruction in the first frame of instructions is sent to a functional unit that performs a store operation.

78. The instruction memory of claim 76 wherein a functional unit appropriate for an instruction in the first frame of instructions comprises an arithmetic logic unit.

79. The instruction memory of claim 78 wherein instructions in the first group of instructions from the first frame of instructions comprise two ALU instructions.

80. The instruction memory of claim 79 wherein an instruction in the second group of instructions from the first frame of instructions comprises a floating point instruction.

81. The instruction memory of claim 80 wherein an instruction from the first frame of instructions comprises a branch instruction.

82. The instruction memory of claim 70 wherein more than two groups of instructions are packed within the first 256 bit-wide frame of instructions thereby reducing instruction code size.

83. The instruction memory of claim 82 wherein the instructions in the first group of instructions are decoded prior to dispatch to the appropriate functional units.

84. The instruction memory of claim 83 wherein the instructions in the first group of instructions in the first frame of instructions are checked for data dependency at compile time.

85. The instruction memory of claim 83 wherein instructions stored in the first frame of instructions and stored in the second frame of instructions are not grouped into a single group of instructions.

86. The instruction memory of claim 82 wherein the instructions in the first instruction frame and the instructions in the second instruction are stored in little-endian format.

87. The instruction memory of claim 70 wherein the first group of instructions and the second group of instructions are packed into the first 256 bit-wide frame of instructions to reduce a number of no-operations in the first 256 bit-wide frame of instructions.

88. The instruction memory of claim 87 wherein a number of instructions in the first group of instructions is identical to a number of instructions in the second group of instructions.

89. The instruction memory of claim 88 wherein the first frame of instructions also comprise a third group of instructions; and wherein a number of instructions in the third group of instructions comprises more than one instruction.

90. The instruction memory of claim 89 wherein an instruction in the first group of instructions from the first frame of instruction specifies at least one source register and one destination register.

* * * * *